US009414371B2

(12) United States Patent
Pi et al.

(10) Patent No.: US 9,414,371 B2
(45) Date of Patent: Aug. 9, 2016

(54) HIERARCHICAL CHANNEL SOUNDING AND CHANNEL STATE INFORMATION FEEDBACK IN MASSIVE MIMO SYSTEMS

(71) Applicant: Samsung Electronics Co., Ltd., Suwon-si, Gyeonggi-do (KR)

(72) Inventors: Zhouyue Pi, Allen, TX (US); Ying Li, Garland, TX (US); Kaushik Josiam, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 13/770,590

(22) Filed: Feb. 19, 2013

(65) Prior Publication Data

US 2013/0272263 A1 Oct. 17, 2013

Related U.S. Application Data

(60) Provisional application No. 61/624,841, filed on Apr. 16, 2012.

(51) Int. Cl.
*H04L 5/00* (2006.01)
*H04L 25/02* (2006.01)
(Continued)

(52) U.S. Cl.
CPC ........... *H04W 72/042* (2013.01); *H04B 7/0626* (2013.01); *H04L 5/0023* (2013.01);
(Continued)

(58) Field of Classification Search
CPC . H04L 5/0023; H04L 25/0391; H04L 5/0007;
H04L 5/0016; H04L 5/0026; H04L 5/0035;
H04L 5/0048; H04L 5/0082; H04L 5/0091;
H04B 7/0478; H04B 7/0639; H04B 7/065;
H04J 13/18
See application file for complete search history.

(56) References Cited

U.S. PATENT DOCUMENTS 8,731,579 B2 * 5/2014 Siomina et al. ............ 455/456.1
8,743,992 B2 * 6/2014 Enescu et al. ............... 375/267
(Continued)

FOREIGN PATENT DOCUMENTS

EP 1505742 2/2005
WO WO 2011/126160 10/2011

OTHER PUBLICATIONS

International Search Report dated Jul. 25, 2013 in connection with International Patent Application No. PCT/KR2013/003118, 4 pages.
(Continued)

*Primary Examiner* — Ayaz Sheikh
*Assistant Examiner* — Debebe Asefa

(57) ABSTRACT

Time, frequency and spatial processing parameters for communications between a base station and a mobile station are selected by transmitting synchronization signals in multiple slices of a wireless transmission sector for the base station, and receiving feedback from the mobile station of at least one preferred slice of the multiple slices. In response to selection of one of the slices as an active slice for communications between the base station and the mobile station, reference signals are transmitted in the selected active slice using a corresponding selected precoder and/or codebook. The mobile station estimates and feeds back channel state information (CSI) based on those reference signals, and the CSI is then employed to determine communication parameters for communications between the base station and mobile station that are specific to the mobile station.

50 Claims, 13 Drawing Sheets

(51) Int. Cl.
  *H04L 1/00* (2006.01)
  *H04B 7/06* (2006.01)
  *H04W 72/04* (2009.01)

(52) U.S. Cl.
  CPC .......... *H04L5/0048* (2013.01); *H04L 25/0204* (2013.01); *H04L 25/0226* (2013.01); *H04L 1/0026* (2013.01); *H04L 5/0057* (2013.01)

(56) References Cited

U.S. PATENT DOCUMENTS

| | | | |
|---|---|---|---|
| 8,891,470 B2 * | 11/2014 | Chun et al. | 370/329 |
| 8,982,779 B2 * | 3/2015 | Li et al. | 370/328 |
| 2008/0069281 A1 | 3/2008 | Olesen et al. | |
| 2008/0298445 A1 | 12/2008 | Richardson et al. | |
| 2009/0298502 A1 | 12/2009 | Hagerman et al. | |

OTHER PUBLICATIONS

Written Opinion of International Searching Authority dated Jul. 25, 2013 in connection with International Patent Application No. PCT/KR2013/003118, 6 pages.

3GPP TSG RAN WG1 meeting #58bis; "Backhaul Issues and its Practical Evaluation Methodology for DL CoMP"; Huawei; Oct. 12-16, 2009; Miyazaki, Japan; 6 pages.

3GPP TSG RAn WG1 Meeting #58; "Downlink CoMP JP Evaluation and Feedback design"; Huawei; Aug. 24-28, 2009; Shenzhen, P.R. China; 5 pages.

European Search Report issued for EP 13778377.5 with mailing date of Nov. 25, 2015, 5 pgs.

* cited by examiner

HIERARCHICAL CHANNEL SOUNDING AND CHANNEL STATE INFORMATION FEEDBACK IN MASSIVE MIMO SYSTEMS

This application hereby incorporates by reference U.S. Provisional Patent Application Ser. No. 61/624,841, filed Apr. 16, 2012, entitled "HIERARCHICAL CHANNEL SOUNDING AND CHANNEL STATE INFORMATION FEEDBACK IN MASSIVE MIMO SYSTEMS."

TECHNICAL FIELD

The present disclosure relates generally to channel state information feedback in wireless mobile communication systems and, more specifically, to hierarchical channel sounding and channel state information feedback in massive multiple input, multiple output (MIMO) wireless communication systems.

BACKGROUND

One of the key challenges for improving the capacity of wireless communications systems with large numbers of transmitter and/or receiver antennae is the large amount of channel state information that must be acquired. For example, with a 256-element base station antenna array and a 64-element mobile station antenna array, the channel matrix between the two devices has a dimension of 256×64, which would be practically impossible to estimate if channel estimation were performed on a per element basis.

There is, therefore, a need in the art to develop improved techniques for acquiring channel state information in massive MIMO systems with large numbers of transmitter and receiver antennas.

SUMMARY

Time, frequency and spatial processing parameters for communications between a base station and a mobile station are selected by transmitting synchronization signals in multiple slices of a wireless transmission sector for the base station, and receiving feedback from the mobile station of at least one preferred slice of the multiple slices. In response to selection of one of the slices as an active slice for communications between the base station and the mobile station, reference signals are transmitted in the selected active slice using a corresponding selected precoder and/or codebook. The mobile station estimates and feeds back channel state information (CSI) based on those reference signals, and the CSI is then employed to determine communication parameters for communications between the base station and mobile station that are specific to the mobile station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
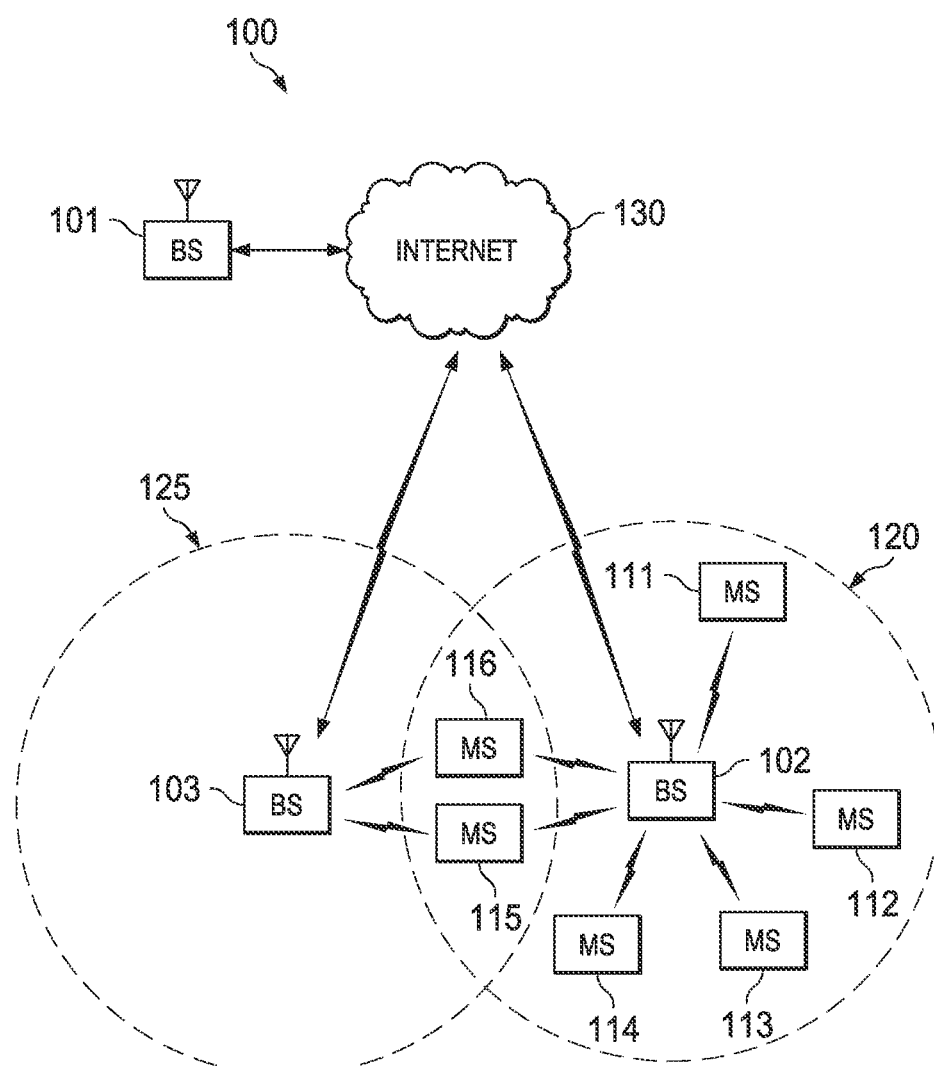
FIG. 1 is a high level diagram illustrating an exemplary massive MIMO wireless network implementing hierarchical channel sounding and channel state information feedback according to one or more embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

To satisfy the explosive growth of mobile (wireless) broadband data traffic, next generation wireless communication systems (i.e., $5^{th}$ Generation or "5G") need to provide 100 to 1,000 times more capacity than existing $4^{th}$ Generation (4G) systems such as Long Term Evolution (LTE), LTE-Advanced, mobile Worldwide Interoperability for Microwave Access (WiMAX) Evolution, etc. Two technologies projected to provide the needed magnitude of capacity improvement are massive MIMO transmission and exploitation of millimeter (mm) wavelength (mm-wave) mobile broadband frequencies (e.g., wavelengths of between 1 mm and 100 mm, corresponding to frequencies of between 3 and 300 gigaHertz (GHz)). The former is described in T. L. Marzetta, "Noncooperative Cellular Wireless with Unlimited Number of Base Station Antennas," *IEEE Trans. Wireless Communication*, vol. 9, no. 11, pp. 3590-3600, November 2010, and the latter in Zhouyue Pi & Farooq Khan, "An Introduction to Millimeter-Wave Mobile Broadband Systems," *IEEE Communications Magazine*, June 2011, each of which is incorporated herein by reference. These two technologies are complementary since higher communication frequencies allow for smaller antennas in base stations and mobile stations, which in turn allow greater numbers of antennas in the same area. For example, for a mm-wave mobile communication system deployed in 6 GHz, the wavelength is 5 centimeters (cm) and the size of a half-wavelength dipole antenna is 2.5 cm, making possible a 256-element antenna array at the base station with the total array size less than 40 cm×40 cm and a 16-element antenna array at the mobile station with a total array size of less than 10 cm×10 cm. Further up the spectrum, it becomes possible to put thousands of antennas in a base station and hundreds of antennas in a mobile station, all in practical form factors for mobile communication devices.

Spatial signal processing technologies with large numbers of antennas, including beamforming (BF), spatial division multiple access (SDMA), and massive MIMO are key to enabling mm-wave mobile broadband communication and drastic performance improvements beyond 4G. With large numbers of antennas at base stations and mobile stations, significant transmitter and receiver BF gain can be achieved, overcoming the path loss disadvantage of high frequency propagation and suppressing unwanted interference. Transmitter and receiver BF with large numbers of antennas can achieve wide area coverage and high spectral efficiency for mm-wave mobile communication, with good spatial separation achieved between links from the same base station to different mobile stations in the downlink, and between links from different mobile stations to the same base station in the uplink. Such spatial separation allows a large degree of freedom in SDMA, which in turn significantly improves system capacity. When the communication channel between a base station and a mobile station becomes sufficiently scattered, a large degree of freedom can also be achieved on the point-to-point communications between the base station and the mobile station, in which case MIMO communication with large rank can be achieved to significantly boost the spectral efficiency for the point-to-point communication links.

As noted above, one of the key challenges for efficient implementation of BF/SDMA/MIMO with large numbers of transmitter and/or receiver antennas is the large amount of channel state information that must be acquired. In accordance with the present disclosure, channel sounding signals (or reference signals) are transmitted and channel state information is estimated and reported in massive MIMO systems with large number of antennas.

As used herein, BF, SDMA, and MIMO are generally referred to collectively as members of the category "spatial processing." For the purpose of illustration, many embodiments are described using transmitter (Tx) and receiver (Rx) BF as examples. However, those embodiments are equally applicable to cases where SDMA and/or MIMO are used (or also used) as spatial processing techniques.

FIG. 1 is a high level diagram illustrating an exemplary massive MIMO wireless network implementing hierarchical channel sounding and channel state information feedback according to one or more embodiments of the present disclosure. The wireless network 100 illustrated in FIG. 1 is provided solely for purposes of explaining the subject matter of the present disclosure, and is not intended to suggest any limitation regarding the applicability of that subject matter. Other wireless networks may employ the subject matter depicted in the drawings and described herein without departing from the scope of the present disclosure. In addition, those skilled in the art will recognize that the complete structure and operation of a wireless network and the components thereof are depicted in the drawings and described therein. Instead, for simplicity and clarity, only so much of the structure and operation of the wireless network and the components thereof as are unique to the present disclosure or necessary for an understanding of the present disclosure are depicted and described.

In the illustrated embodiment, wireless network 100 includes a base station (BS) 101, BS 102, and BS 103. Depending on the network type, other well-known terms may be used instead of "base station," such as "Evolved Node B" (eNB) or "access point" (AP). For simplicity and clarity, the term "base station" will be used herein to refer to the network infrastructure components that provide wireless access to remote (mobile or fixed) terminals.

The BS 101 communicates with BS 102 and BS 103 via network 130 operating according to a standardized protocol (e.g., X2 protocol), via a proprietary protocol, or preferably via Internet protocol (IP). IP network 130 may include any IP-based network or a combination thereof, such as the Internet, a proprietary IP network, or another data network.

The BS 102 provides wireless broadband access to a first plurality of mobile stations (MSs) within coverage area 120 of BS 102. In the example illustrated, the first plurality of MSs includes MS 111, which may be located in a small business; MS 112, which may be located in an enterprise; MS 113, which may be located in a WiFi hotspot; MS 114, which may be located in a first residence; MS 115, which may be located in a second residence; and MS 116, which may be a mobile device, such as a cell phone, a wireless laptop, a wireless-enabled tablet, or the like. For simplicity and clarity, the term "mobile station" or "MS" is used herein to designate any remote wireless equipment that wirelessly accesses or communicates with a BS, whether the MS is a mobile device (e.g., cell phone, wireless-enabled tablet or laptop, etc.) or is normally considered a stationary device (e.g., desktop personal computer, wireless television receiver, etc.). In other systems, other well-known terms may be used instead of "mobile station," such as "user equipment" (UE), "subscriber station" (SS), "remote terminal" (RT), "wireless terminal" (WT), and the like.

The BS 103 provides wireless broadband access to a second plurality of MSs within coverage area 125 of BS 103. The second plurality of MSs includes MS 115 and MS 116. In an exemplary embodiment, BSs 101-103 communicate with each other and with MSs 111-116 using millimeter wave wireless communications. While only six MSs are depicted in FIG. 1, it will be understood that wireless network 100 may provide wireless broadband access to additional MSs.

Figure 1A:
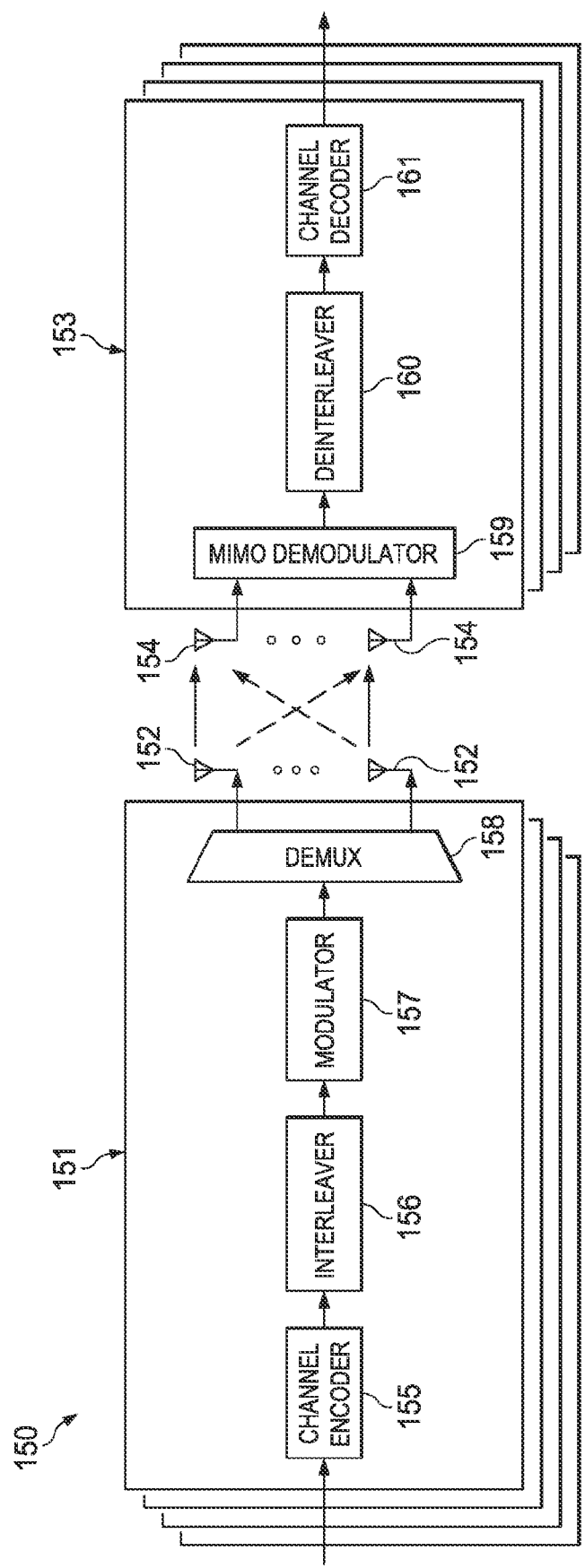
FIG. 1A is a high level block diagram illustrating further details relating to components within the massive MIMO wireless communication system of FIG. 1.

FIG. 1A is a high level block diagram illustrating further details relating to components within the massive MIMO wireless communication system of FIG. 1. The wireless communication system component portions 150 collectively depicted in FIG. 1A is a portion of the wireless network 100 of FIG. 1. As understood by those skilled in the art, each BS 101-103 and each MS 111-116 includes an array of antenna or antenna elements, a transmitter and a receiver each separately coupled to the antenna to transmit or receive radio frequency signals, encoding and modulation circuitry within the transmitter chain coupled to the transmitter and demodulation and decoding circuitry within the receiver chain coupled to the receiver, and a programmable processor or controller including and/or connected to memory and coupled to the transmitter and receiver chains for controlling operation of the respective BS or MS.

In the example of FIG. 1A, wireless communication is effected by at least one radio frequency (RF) transmitter chain 151 coupled to an array of antenna or antenna elements 152 and controlled by a processor (not shown) and at least one RF receiver chain 153 coupled to an array of antenna or antenna elements 154 and also controlled by a processor (also not shown). In the exemplary embodiment, the transmitter chain 151 forms part of one of BSs 101-103 and the receiver chain 153 forms part of one of the MSs 111-116 in the exemplary embodiment. However, as understood by those skilled in the art, each BS 101-103 and each MS 111-116 includes both a transmitter and a receiver each separately coupled to the respective antenna array to transmit or receive radio frequency signals over the channel therebetween, such that the transmitter chain 151 may alternatively be disposed within one of the MSs 111-116 and the receiver chain 152 may alternatively be disposed within one of the BSs 101-103.

It should be noted that each BS 101-103 and each MS 111-116 may have multiple instances of duplicative RF transmitter and receiver chains 151 and 153 each coupled to one or more processor(s) operating cooperatively and each separately processing signals for transmission on antenna array 152 or signals received on antenna array 154. Four transmitter and receiver chains are depicted in FIG. 1A, although a given communications device (one of BSs 101-103 or MSs 111-116) may have either more or fewer such RF chains. The presence of multiple RF chains may be exploited in connection with the present disclosure in the manner discussed in further detail below.

In the example depicted, the transmitter chain 151 includes encoding and modulation circuitry comprising channel encoder 155 receiving and encoding data for transmission, an interleaver 156 coupled to the channel encoder 155, a modulator 157 coupled to the interleaver 156, and a demultiplexer 158 coupled to the modulator 157 and antenna elements 152. In the example depicted, the receiver chain 153 includes demodulation and decoding circuitry and comprising a demodulator 159 coupled to the antenna elements 154, a deinterleaver 160 coupled to the demodulator 159 and a channel decoder 161 coupled to the deinterleaver 160. In addition, transmitter chain 151 and receiver chain 152 may each be coupled to or include a programmable processor or controller (not shown) including and/or connected to memory (also not shown) and controlling operation of the respective BS or MS. Using such components, synchronization signals are transmitted by a BS and received by an MS in the manner described in further detail below.

Figure 2:
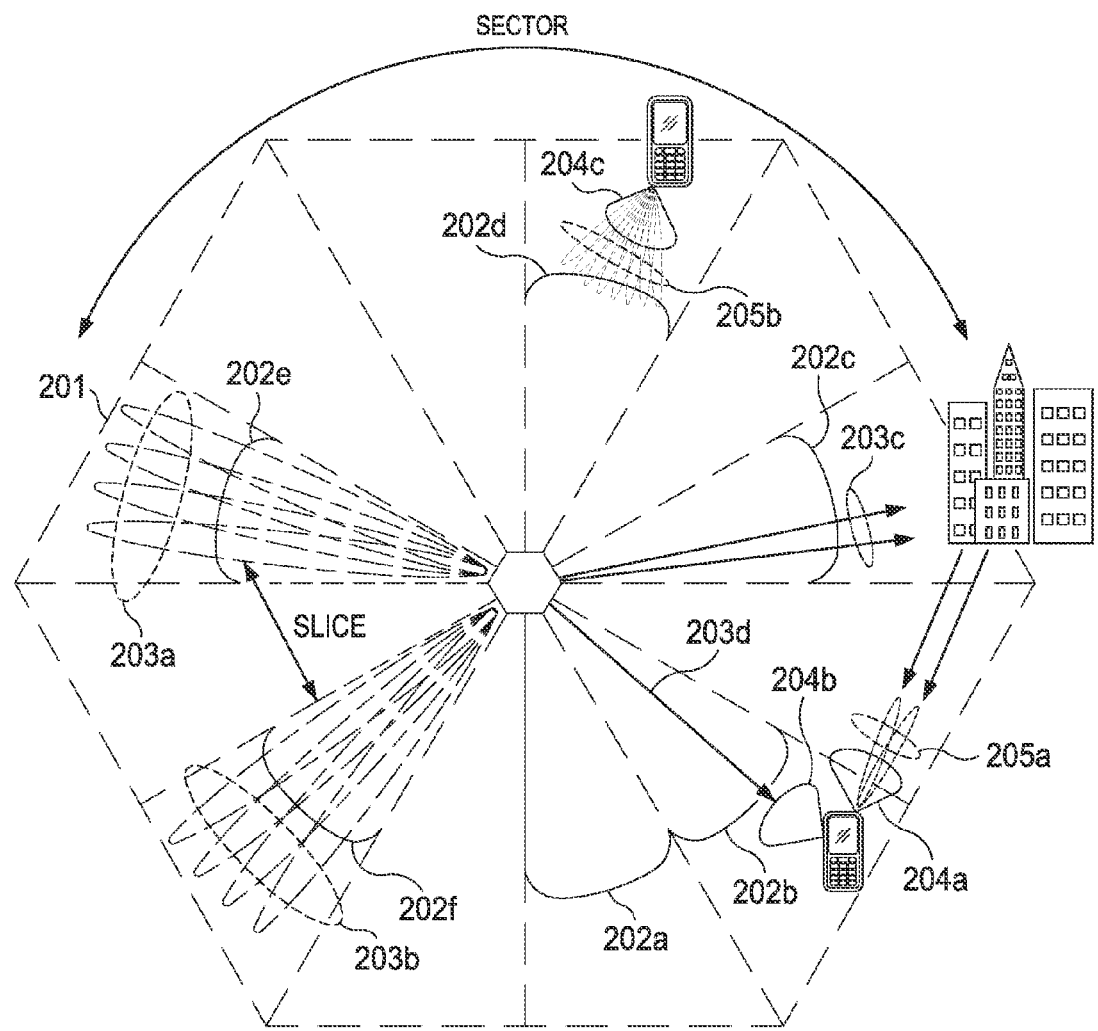
FIG. 2 diagrammatically illustrates some spatial processing technologies that may be employed during hierarchical channel sounding and channel state information feedback within a massive MIMO wireless network according to one or more embodiments of the present disclosure.

FIG. 2 diagrammatically illustrates some spatial processing technologies that may be employed during hierarchical channel sounding and channel state information feedback within a massive MIMO wireless network according to one or more embodiments of the present disclosure. In the example shown in FIG. 2, the cell 201 has three sectors each covering 120° of the azimuth, with four 30° slices within each sector, where a "slice" is defined as the coverage area of a set of transmitter spatial processing schemes within a sector. In MIMO systems with large number of antennas, Tx BF and Rx BF are frequently used to improve desired signal strength and reduce unwanted interference. Both the base station and the mobile station can use BF, with different half-power beam widths (HPBWs). For example, for a base station to transmit a control channel message to UEs in a slice, a coarse Tx BF precoder with 30° HPBW can be used so that the resulting transmission covers the whole slice 202a. For a base station to transmit to a particular mobile station, a fine Tx BF precoder with smaller HPBW can be used for increased BF gain and reduced interference to other UEs.

Coarse Tx BF has many benefits. Signals 202a, 202b, 202c, 202d, 202e and 202f precoded using coarse Tx BF precoders are easy to acquire with only a small amount of reference signal overhead. Once identified, the base station can use the respective coarse Tx BF precoder to communicate to a mobile station within the coverage area (preferably a portion of a slice) for a long period of time, since the coverage of a coarse Tx BF precoder signal is generally wide and generally a mobile station takes a long time to move out of the coverage are of a coarse Tx BF precoder signal. However, due to the large HPBW, coarse Tx BF has small Tx BF gain, which means a reduced link budget or data rate and increased interference to other users, slices or sectors. For such reasons, it is generally preferred to use coarse Tx BF precoders for system broadcast, control channel transmission, and data channel communication to high mobility users.

On the other hand, signals 203a, 203b, 203c and 203d precoded using fine Tx BF precoders have large Tx BF gain and can thus increase the desired signal strength and reduce interference significantly, which leads to user throughput and system capacity improvement. However, sophisticated channel state information (CSI) acquisition procedures with extensive reference signal overhead are required to obtain the necessary channel state information for accurate selection or generation of fine Tx BF precoders. Fine Tx BF precoders are also sensitive to channel estimation error and, due to the small HPBW, communications over these precoders are subject to frequent switching since mobile stations easily move out of the coverage of a fine Tx BF precoder. In some situations, even the short-term, small-scale fading (i.e., fast fading) of the channel can cause fine Tx BF precoder change. For such reasons, fine Tx BF precoders are generally preferred for use in data channel communication to low mobility users where closed-loop BF can be established.

Similarly, coarse Rx BF reception patterns 204a, 204b and 204c and fine Rx BF reception patterns 205a and 205b can be employed at the mobile station side, depending on the channel condition, the signals or channels to be carried, and mobility.

In the illustration of FIG. 2, coarse Tx BF, fine Tx BF, coarse Rx BF, and fine Rx BF are described and analyzed for the downlink. Similar analysis can be obtained for coarse and fine Tx and Rx BF in the uplink. In addition, there can also be multiple levels of coarse and fine precoders for Tx and Rx BF.

With hierarchical channel sounding and channel state information feedback schemes, the channel state information in a large dimensional channel matrix can be acquired and reported via multiple stages with the initial stages focusing on sounding and feedback of long-term, large-scale CSI and the latter stages focusing on sounding and feedback of short-term, small-scale CSI. Once the long-term and large-scale CSI is acquired, coarse Tx and Rx BF can be established, which improves the performance of communications for certain channels, e.g., packet data control channels. Additionally, the CSI sounding signals (or reference signals) and the codebook for short-term and small-scale CSI can be dependent on the long-term and large-scale CSI. As shown in FIG. 2, a different Tx BF codebook for fine Tx BF can be selected based on the coarse Tx BF (or long-term and large-scale CSI). Different Rx BF codebooks for fine Rx BF can be selected based on the coarse Rx BF (or long-term and large-scale CSI).

Figure 3:
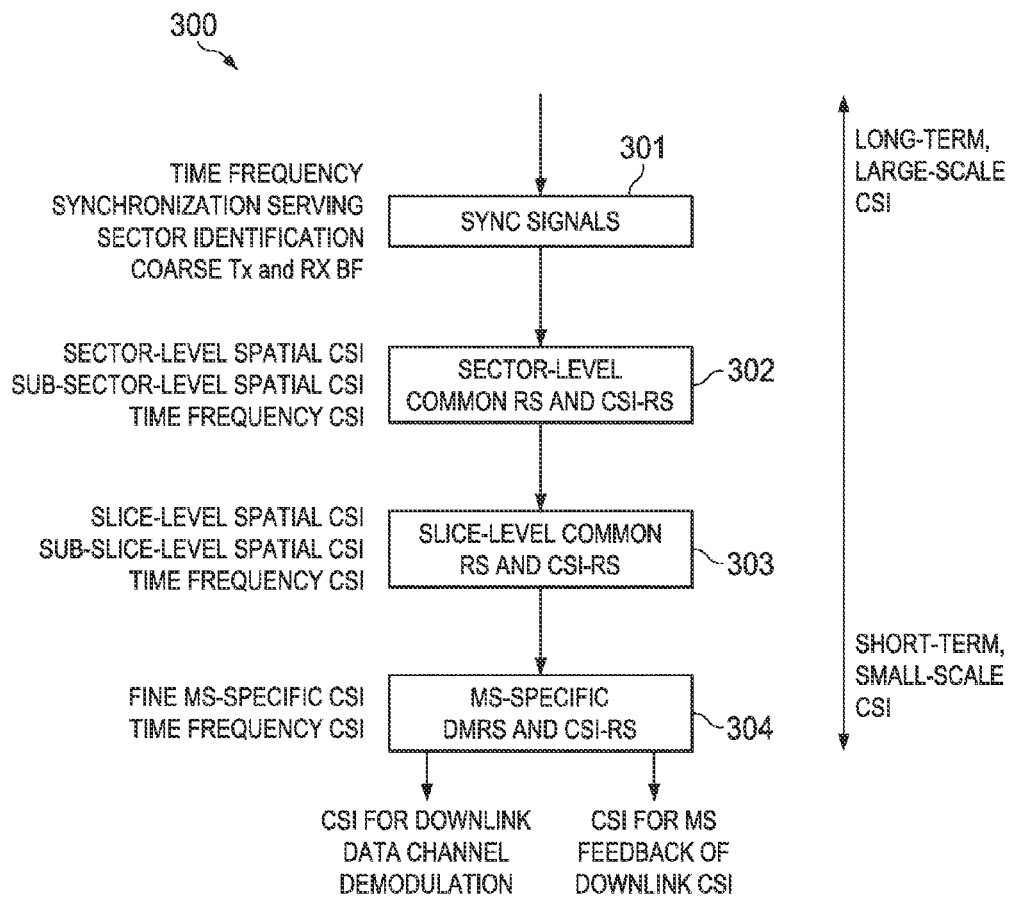
FIG. 3 illustrates a timing for hierarchical channel sounding and channel state information feedback within a massive MIMO wireless network according to one embodiment of the present disclosure.

FIG. 3 illustrates an exemplary timing for hierarchical channel sounding and channel state information feedback within a massive MIMO wireless network according to one embodiment of the present disclosure. For simplicity, the hierarchical channel sounding and CSI feedback are illustrated using examples with two-stage CSI feedback, with the first stage corresponding to coarse Tx and Rx BF based on long-term and large-scale CSI, and the second stage corresponding to fine Tx and Rx BF based on short-term and small-scale CSI. In some examples, the coarse Tx BF in the downlink is further simplified to selecting a preferred or active slice in a sector.

A plurality of sounding signals or reference signals are transmitted to aid the acquisition of CSI in multiple stages. One example is depicted in FIG. 3, which illustrates how CSI can be acquired in the downlink of a massive MIMO system with a large number of transmitter or receiver antennas. The signal sequence 300 begins with the base station transmitting synchronization (sync) signals (sequence portion 301), preferably in a periodic fashion. The mobile station acquires the sync signals from at least one base station, and should preferably acquire time and frequency synchronization with the at least one base station. In a multi-base station environment, the mobile station should also identify the most preferred base station (or base stations) for communication. In addition, the base station and mobile station can also identify long-term and large-scale transmitter and receiver side spatial information, such as the angle of departure (AoD) information at the base station and the angle of arrival (AoA) information at the mobile station. Such spatial information is typically location and environment dependent, and therefore does not change rapidly due to short-term and small-scale fading.

Figure 4A:
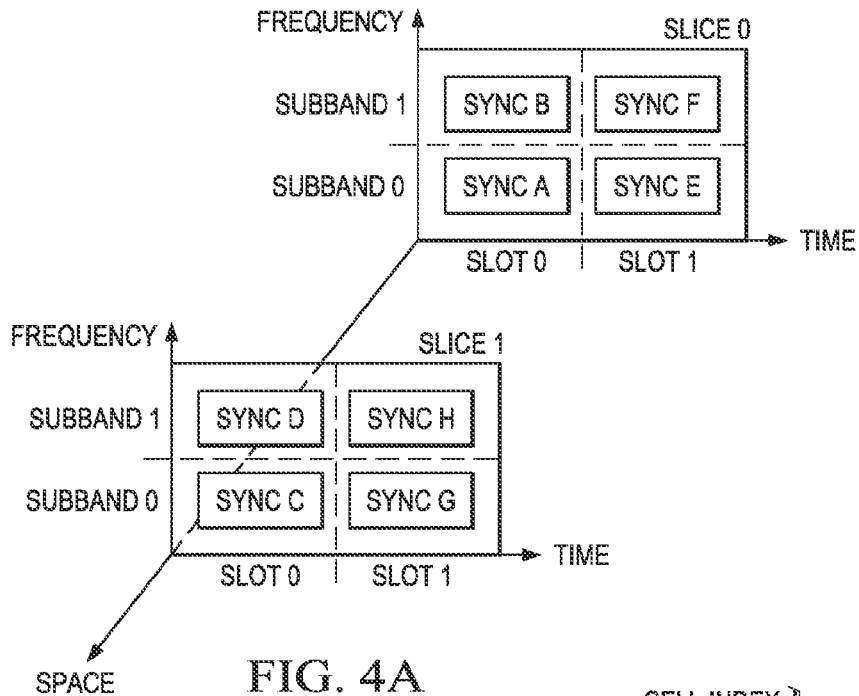
FIGS. 4A and 4B illustrate time-frequency-space multiplexing of synchronization signals in connection with hierarchical channel sounding and channel state information feedback within a massive MIMO wireless network according to one embodiment of the present disclosure.
Figure 4B:
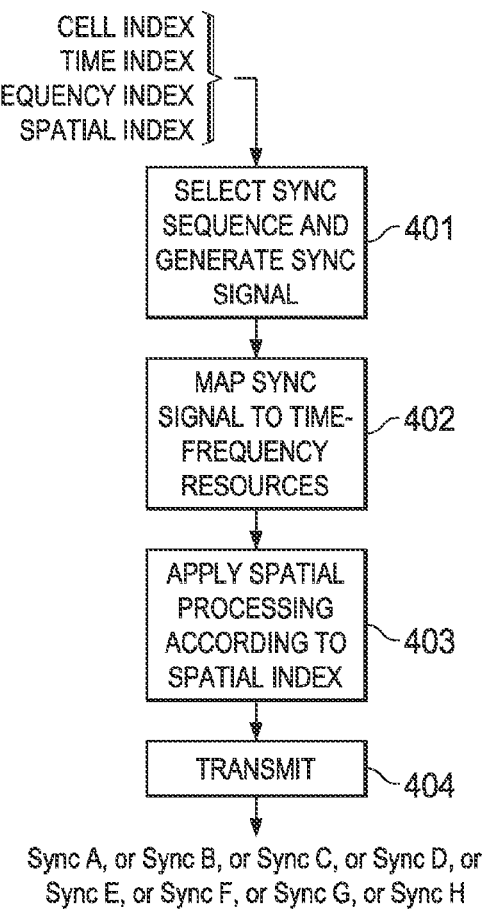

The remaining portions of FIG. 3 will be explained in conjunction with FIGS. 4A-4B and 5-9. FIGS. 4A and 4B illustrate time-frequency-space multiplexing of synchronization signals in connection with hierarchical channel sounding and channel state information feedback within a massive MIMO wireless network according to one embodiment of the present disclosure. In one embodiment of the disclosure, to allow the base station and/or the mobile station to acquire long-term large-scale spatial information, the base station may transmit multiple sync signals, with each sync signal being spatially processed by a different transmitter spatial processing scheme. For example, the base station may transmit multiple sync signals via multiple antennas, or via multiple angle of departures, or using multiple transmitter BF precoders. Each sync signal may carry an identification of the associated transmitter spatial processing scheme, e.g., antenna ID, transmitter BF precoder ID, or any kind of signature to identify the associated sync signals. Each sync signal may also carry the associated cell index, and the index of the time and frequency resources on which the sync signal is transmitted. An example of carrying the Cell Index, Time Index, Frequency Index, and Spatial Index is shown in FIG. 4B, in which those variables are received as inputs to selection of a sync sequence and generation of the sync signal (block 401). In this example, these indices are carried implicitly by selecting different sync sequences and/or generating different sync signals for different values of the indices. These multiple copies of sync signals can be multiplexed in different time symbols, or different frequency subcarriers, or different spatial directions.

One example of how base station transmits (and how mobile station receives) sync signals is shown in FIG. 4A. As illustrated, the base station transmits multiple sync signals in time, frequency, and space domains. Here the space domain can be interpreted as different antennas, or different BF precoders, or different angles of departure, or different coverage area ("slices") within a cell or sector. For illustration purpose, different sync signals are presumably transmitted in different slices in a sector: Sync A, Sync B, Sync E and Sync F in Slice 0, Sync C, Sync D, Sync G and Sync H in Slice 1, etc. For convenience, we use the notation of (time, frequency, space) triplets to describe the time-frequency resource allocation and the associated spatial processing for a signal. Thus, in this example, base station transmits Sync A using (Slot 0, Subband 0, Slice 0), transmits Sync B using (Slot 0, Subband 1, Slice 0), transmits Sync C using (Slot 0, Subband 0, Slice 1), transmits Sync D using (Slot 0, Subband 1, Slice 1), transmits Sync E using (Slot 1, Subband 0, Slice 0), transmits Sync F using (Slot 1, Subband 1, Slice 0), transmits Sync G using (Slot 1, Subband 0, Slice 1), and transmits Sync H using (Slot 1, Subband 1, Slice 1). In order to distinguish the sync signals from different cells (or sectors) at different times, frequencies, or slices, the sync sequence selection or sync signal generation can be dependent on some or all of cell index, time index, frequency index, and spatial index, as shown in FIG. 4B. For example, to distinguish sync signals for different slices, different sync sequences may be selected for the different slices; and to distinguish sync signals for different cells, different sync sequences may be selected for each cell. After the sync signals are generated, the sync signals are mapped to the corresponding time frequency resources (block 402) and are subject to the corresponding spatial processing (block 403) before being transmitted (block 404).

In another embodiment of the disclosure, the mobile station can also attempt to receive the sync signal using different receiver spatial processing schemes. For example, the mobile station may attempt to receive the sync signals via multiple receiver antennas, or via multiple angle of arrivals, or using multiple receiver BF precoders. Upon successful detection of the sync signals from at least one base station, the mobile station can identify at least one preferred transmitter spatial processing scheme (e.g., at least one preferred long-term large-scale Tx BF precoder), and at least one preferred receiver spatial processing scheme (e.g., at least one preferred long-term large-scale Rx BF precoder). The identification of these preferred base stations for a mobile station, and the associated preferred long-term large-scale transmitter and receiver spatial processing, can greatly help the base station and the mobile station narrow down the space for further sounding and estimation of short-term small-scale channel state information. At least one (long-term large-scale BS Tx Spatial Processing, long-term large-scale MS Rx Spatial Processing) pair can be identified as the preferred spatial processing scheme for the link between the base station and the mobile station. The mobile station can report the detected at least one base station, the identified at least one preferred long-term large-scale transmitter spatial processing, and the identified at least one preferred long-term large-scale receiver spatial processing back to the network. The network, which includes the at least one preferred base station, determines at least one active transmitter (or active slice) spatial processing scheme for communications with the MS. Preferably, the at least one active transmitter (or active slice) spatial processing scheme should be selected from the Tx BF schemes of the at least one preferred (Tx BF, Rx BF) pair that is indicated by the MS. The BS should also signal the selected at least one active transmitter (or active slice) spatial processing scheme to the MS, among other spatial processing configuration parameters.

Figure 5:
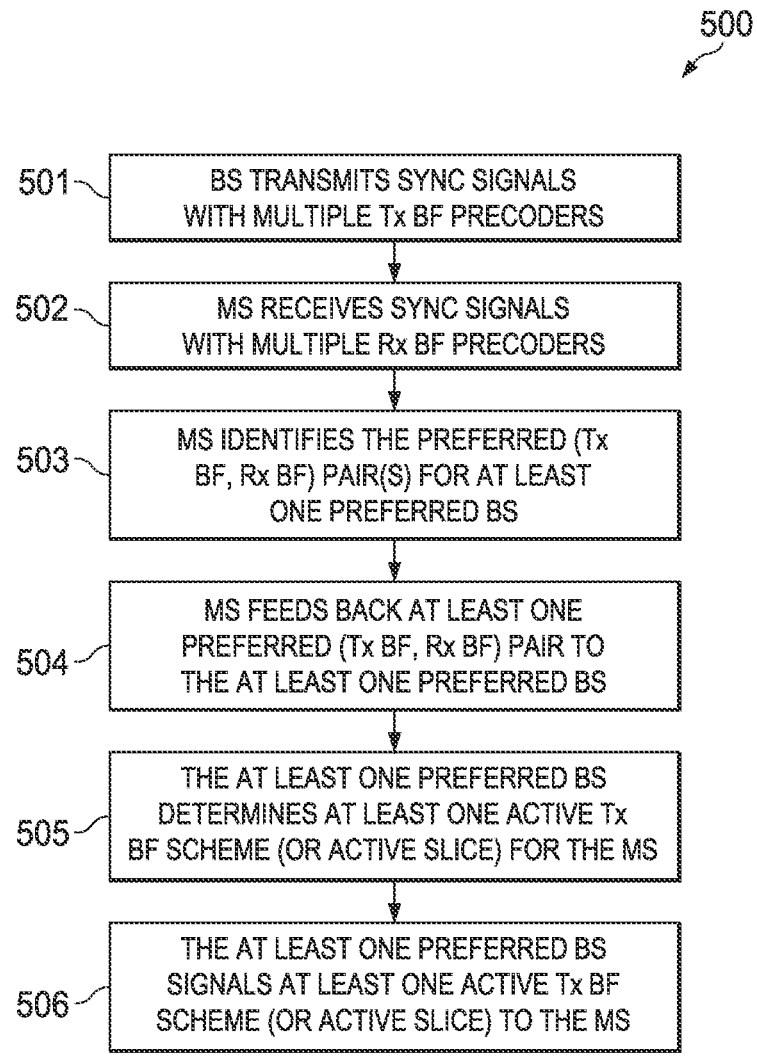
FIG. 5 illustrates one example of the BS and MS operation for acquiring long-term large-scale channel state information via sync signals according to one embodiment of the present disclosure.

FIG. 5 illustrates one example of the BS and MS operation for acquiring long-term large-scale channel state information via sync signals according to one embodiment of the present disclosure. The exemplary process 500 for acquiring long-term, large-scale spatial CSI information using sync signals begins with the base station(s) transmitting sync signals with multiple Tx precoders (step 501). The MS receives the transmitted sync signals with multiple Rx precoders (step 502), identifies the preferred Tx BF, Rx BF pair(s) for at least one of the base stations that transmitted sync signals (step 503), and feeds back at least one of the identified preferred, Tx BF, Rx BF pair(s) to the at least one preferred base station (step 504). The mobile station may identify and feedback more than one preferred Tx BF, Rx BF pair (with an indication of an order of preference, such as an order of listing) for each base station that transmitted sync signals detected by the MS, and may identify and feedback preferred Tx BF, Rx BF pair(s) for more than one base station that transmitted sync signals detected by the MS (again, with some indication of an order of preference, such as an order of listing). In identifying "preferred" Tx BF, Rx BF pair(s), the MS may employ threshold criteria, which may differ for different base stations that transmitted sync signals detected by the MS, or may identify only a predetermined total number of preferred Tx BF, Rx BF pair(s), either per base station or for all of the base stations in the aggregate. The preferred base station(s) determine at least one active Tx BF scheme (or active slice) for the MS (step 505), and signal(s) the at least one active Tx BF scheme (or active slice) to the MS (step 506).

Referring back to FIG. 3, in CSI acquisition steps subsequent to the sequence portion 301 discussed above, the base station selects short-term small-scale transmitter beamforming precoders (or other transmitter spatial processing schemes) that are strongly correlated with the long-term large-scale Tx BF precoders determined based upon the previously transmitted signals (e.g., sequence 301 in this example), and the mobile station selects short-term small-scale Rx BF precoders (or other receiver spatial process schemes) that are strongly correlated with the long-term large-scale Rx BF precoders determined in earlier steps (e.g., based upon sequence 301 in this example). In other words, the reference signals, and the search space for short-term small-scale transmitter spatial processing schemes (e.g., the transmitter BF/SDMA/MIMO codebook), and the search space for short-term small-scale receiver spatial processing schemes (e.g., the receiver BF/SDMA/MIMO codebook), and the MS feedback of the short-term small-scale transmitter and/or receiver spatial processing schemes, can be dependent on the long-term large-scale transmitter and receiver spatial processing schemes determined earlier.

In one embodiment of the disclosure, the dependency can be manifested as choosing a different transmitter BF/SDMA/MIMO codebook (or a different set of transmitter BF/SDMA/MIMO precoders) for different long-term, large-scale transmitter spatial processing schemes, when selected.

The different codebooks may be derived in many ways. For instance, assuming that the base station and the mobile station select a first slice as the preferred slice for the mobile station, the base station and the mobile station can select a first codebook as the codebook for feedback of short-term small-scale CSI. If the base station and the mobile station alternatively select a second slice as the preferred slice for the mobile station, the base station and the mobile station can select a second codebook for the second slice as the codebook for feedback of short-term small-scale CSI. The selection of the codebook for short-term small-scale CSI feedback can be explicitly signaled between the base station and the mobile station. For example, the base station may send a message to a mobile station to assign a codebook for the mobile station to use for CSI feedback. Alternatively, a slice-to-codebook mapping can be established in advance, such that once the preferred slice for a mobile station is selected, both the base station and the mobile station know what codebook should be used for short-term small-scale CSI feedback according to the slice-to-codebook mapping.

Similarly, the base station and the mobile station may select a different subset in a codebook subset for different slices, when selected. The selection of the subset can be signaled explicitly, or can be established via a slice-to-subset mapping established in advance.

The base station and the mobile station may choose a different method of transformation (e.g., a transformation matrix) for a different slice. The selection of the transformation can be signaled explicitly, or can be established via a slice-to-transformation mapping.

The base station and the mobile station may choose a different method of construction for a slice or for different slices among a plurality of slices. The selection of the codebook construction can be signaled explicitly, or can be established via a slice-to-construction mapping.

In another embodiment of the disclosure, the dependency can be manifested as choosing a different receiver BF/SDMA/MIMO codebook (or a different set of receiver BF/SDMA/MIMO precoders) for a different long-term large-scale receiver spatial processing scheme (e.g., determined in step 201). Like the different transmitter codebook, the different receiver codebook can be derived in many ways, e.g., using codebook selection, or codebook subset selection, or codebook transformation, or codebook construction. And the selection of the codebook, or codebook subset, or codebook transformation, or codebook construction can be signaled explicitly from the base station to the mobile station (or vice versa), or be established as an implicit mapping from the selected long-term large-scale receiver spatial processing scheme.

In another embodiment of the disclosure, the dependency can also be manifested as mapping an index of a MS feedback field to different transmitter BF/SDMA/MIMO precoders for different long-term large-scale transmitter spatial processing scheme (e.g., as determined based upon sequence 301). For example, if a mobile station selects a first slice as the active slice for that mobile station at a current location under current conditions, a first index of a MS feedback field can be mapped to a first Tx precoder; however if the mobile station instead selects a second slice as the active slice, the first index of the MS feedback field can be mapped to a second Tx precoder. The different index-to-precoder mapping can be either signaled explicitly, or may be determined implicitly according to the selected long-term large-scale transmitter spatial processing scheme.

In another embodiment of the disclosure, the dependency can also be manifested as mapping an index of a MS feedback field to different receiver BF/SDMA/MIMO precoders for different long-term large-scale receiver spatial processing scheme (e.g., as determined based upon sequence 301). For example, if a mobile station selects a first wide-beam receiver precoder as the preferred long-term large-scale receiver precoder for that mobile station at a current location under current conditions, a first index of a MS feedback field can be mapped to a first Rx precoder; however if the mobile station instead selects a second wide-beam receiver precoder as the preferred long-term large-scale receiver precoder, the first index of the MS feedback field can be mapped to a second Rx precoder. The different index-to-precoder mapping can be either signaled explicitly, or may be determined implicitly according to the selected long-term large-scale receiver spatial processing scheme.

Figure 6:
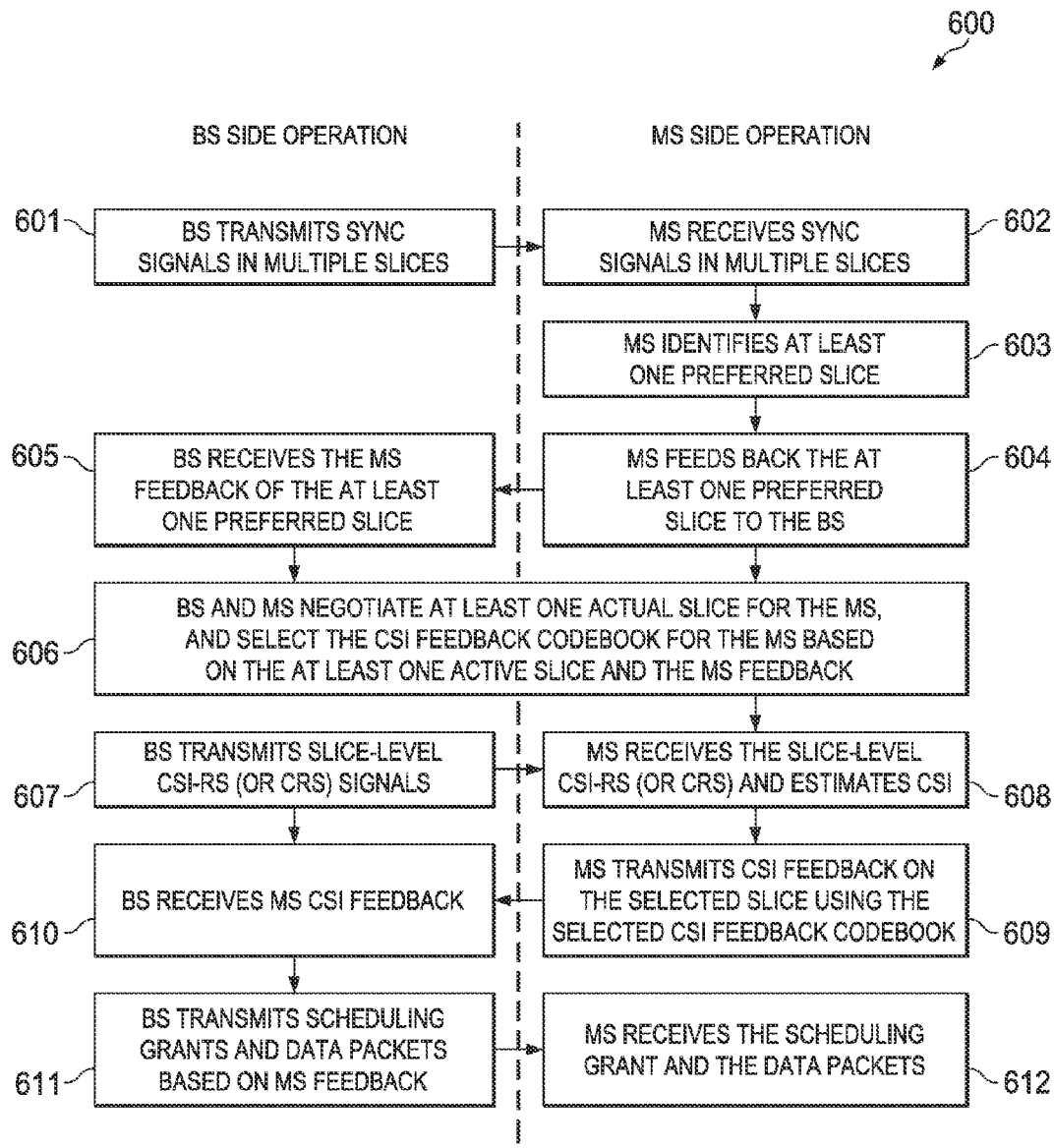
FIG. 6 is a process flow diagram of an example of base station and mobile station operation with short-term CSI feedback depending on long-term CSI feedback according to one embodiment of the present disclosure.

FIG. 6 is a process flow diagram of an example of base station and mobile station operation with short-term CSI feedback depending on long-term CSI feedback according to one embodiment of the present disclosure. In this example, the long-term large-scale CSI is represented by the active slice of a mobile station. Depending on which slice is active for a mobile station, the mobile station may use different codebooks for its CSI feedback. Thus the process 600 begins with the BS transmitting sync signals in multiple slices (step 601), which are received in multiple slices by the MS (step 602). The MS identifies at least one preferred slice (step 603) and feeds back the identity of the at least one preferred slice to the BS (step 604). Upon receiving the MS feedback of the at least one preferred slice from the MS (step 605), the BS and MS negotiate at least one actual slice to be active for the MS, and select the CSI feedback codebook for the MS based on the selected at least one active slice and the MS feedback (step 606).

Referring back to FIG. 3, the base station can transmit sector-level common reference signals (sector-level CRS) in signal sequence 302. These sector-level CRS can be transmitted via multiple antennas or using multiple transmitter BF precoders. These sector-level CRS can be multiplexed in time, frequency, and space. Different sequences can be used for different sector-level CRS for identification, interference randomization and suppression purposes. As a result, sector-level CSI or sub-sector-level CSI can be acquired using these reference signals. The base station may broadcast certain common control signals (e.g., Broadcast Control Channel) to the whole sector together with the sector-level CRS. The mobile stations can use the sector-level CRS to estimate the channel for demodulation of these common control signals. At the same time, the mobile station receiving the sector-level CRS signals can use these sector-level CRS to improve the accuracy and granularity of CSI for feedback purpose. In the example shown in FIG. 3, the mobile station utilizes the sector-level CRS to improve the sector-level and sub-sector-level spatial CSI. If the sector-level CRS provides sufficient coverage and density in both time and frequency, higher resolution and accuracy of the CSI in time and frequency (e.g., sub-band CSI feedback for closed-loop BF/SDMA/MIMO operation) can also be obtained.

In signal sequence 302, the base station can also transmit sector-level CSI reference signals (sector-level CSI-RS). These sector-level CSI-RS can be transmitted via multiple antennas or using multiple transmitter BF precoders. These sector-level CSI-RS can be multiplexed in time, frequency, and space. Different sequences can be used for different sector-level CSI-RS for identification, interference randomization, and interference suppression purposes. Compared with sector-level CRS, the sector-level CSI-RS received by the MS primarily serve the purpose of assisting CSI estimation at the mobile station for CSI feedback. Therefore, the time-frequency density (and thus the overhead) of the sector-level CSI-RS can be made lower than that of the sector-level CRS. On the other hand, in order to improve the spatial resolution of the sector-level CSI-RS in a MIMO system with large number of transmitter and receiver antennas, the sector-level CSI-RS may provide higher spatial sounding capability than the sector-level CRS. For example, the base station can transmit the sector-level CSI-RS using a larger number of transmitter BF precoders than the number of transmitter BF precoders used to transmit sector-level CRS. In order to achieve higher spatial sounding capability, the transmitter BF precoders for sector-level CSI-RS should also have higher BF gain, and thus smaller half-power beam width (HPBW), than the transmitter BF precoders for sector-level CRS. The mobile station can use these sector-level CSI-RS to improve the accuracy and granularity of CSI estimation for CSI feedback. In the example shown in FIG. 3, the mobile station utilizes the sector-level CSI-RS to improve the sector-level and sub-sector-level spatial CSI. If the sector-level CSI-RS provide sufficient coverage and density in both time and frequency domain, higher resolution and accuracy of the CSI in time and frequency (e.g., sub-band CSI feedback for closed-loop BF/SDMA/MIMO operation) can also be obtained.

In signal sequence 303, the base station can transmit slice-level CRS (step 607). Like the sector-level CRS, these slice-level CRS can be transmitted via multiple antennas or using multiple transmitter BF precoders. These slice-level CRS can be multiplexed in time, frequency, and space. Different sequences can be used for different slice-level CRS for identification, interference randomization, and interference suppression purposes. As a result, slice-level CSI or sub-slice level CSI can be acquired using these reference signals (step 608). Once the BS receives CSI feedback from the MS (step 610), the BS transmits scheduling grants and data packets to the MS based on the feedback (steps 611 and 612). Different from the sector-level CRS, the slice-level CRS of a slice are transmitted using transmitter BF precoders that have strong spatial correlation with the slice. In other words, the slice-level CRS of a slice stay "within" or "close to" the spatial coverage of a slice in a sector. As such, the interference between a first slice-level CRS in a first slice of a sector and a second slice-level CRS in a second slice of that sector is likely to be small.

In one embodiment of the disclosure, a base station can spatially multiplex the slice-level CRS of different slices in the same time and frequency resources. Different sequences should be used for these reference signals to achieve identification, interference randomization, and interference suppression. The base station may broadcast certain common control signals (e.g., Packet Data Control Channel) to the whole slice together with the slice-level CRS. The mobile stations can use the slice-level CRS to estimate the channel for demodulation of these common control signals. At the same time, the mobile station can use these slice-level CRS to improve the accuracy and granularity of CSI for feedback purpose (step 608). In the example shown in FIG. 3, the mobile station utilizes the slice-level CRS to improve the slice-level and sub-slice-level spatial CSI. If the slice-level CRS provides sufficient coverage and density in both time and frequency, higher resolution and accuracy of the CSI in time and frequency (e.g., sub-band CSI feedback for closed-loop BF/SDMA/MIMO operation) can also be obtained.

In another embodiment of the disclosure, the configuration of slice-level CRS can be dynamically adjusted. For example, base station may turn off the slice-level CRS of a slice if there is no mobile station in connected state currently located in that slice. The base station may subsequently turn on the slice-level CRS of a slice if at least one mobile station in the connected state enters into that slice. More generally, the base station can dynamically configure the density of slice-level CRS of a slice depending on the load in that slice. Upon reconfiguring the slice-level CRS, the base station should transmit a message to the mobile stations in the slice to inform those mobile stations of the change. The message can be either a broadcast message or a uni-cast message. Upon receiving the message of slice-level CRS configuration, each mobile station should reconfigure its CSI channel estimator to utilize the new configuration of slice-level CRS for CSI channel estimation purposes.

In signal sequence 303, the base station can also transmit slice-level CSI-RS (also step 607). Like the sector-level CSI-RS, these slice-level CSI-RS can be transmitted via multiple antennas or using multiple transmitter BF precoders. These slice-level CSI-RS can be multiplexed in time, frequency, and space. Different sequences can be used for different slice-level CSI-RS for identification, interference randomization and interference suppression purposes. As a result, slice-level CSI or sub-slice level CSI can be acquired using these reference signals (step 608).

In one embodiment of the disclosure, the slice-level CSI-RS of a slice are transmitted using transmitter BF precoders that have strong spatial correlation with the slice. In other words, the slice-level CSI-RS of a slice stay "within" or "close to" the spatial coverage of a slice in a sector. As such, the interference between a first slice-level CSI-RS in a first slice of a sector and a second slice-level CSI-RS in a second slice of that sector is likely to be small.

In another embodiment of the disclosure, a base station spatially multiplexes the slice-level CSI-RS of different slices in the same time and frequency resources. The base station may use different sequences for the slice-level CSI-RS in different slices to achieve identification, interference randomization, and interference suppression.

In another embodiment of the disclosure, the configuration of slice-level CSI-RS can be dynamically adjusted. For example, base station may turn off the slice-level CSI-RS of a slice if there is no mobile station in a connected state currently located within that slice. The base station may subsequently turn on the slice-level CSI-RS of a slice if at least one mobile station in a connected state enters into that slice. More generally, the base station can dynamically configure the density of slice-level CSI-RS of a slice depending on the load in that slice. Upon reconfiguring the slice-level CSI-RS, the base station should transmit a message to the mobile stations in the slice to inform those mobile stations of the changes. The message can be either a broadcast message or a uni-cast message. Upon receiving the message of slice-level CSI-RS configuration, the mobile station should reconfigure its CSI channel estimator to utilize the new configuration of slice-level CSI-RS for CSI channel estimation purpose.

Figure 7:
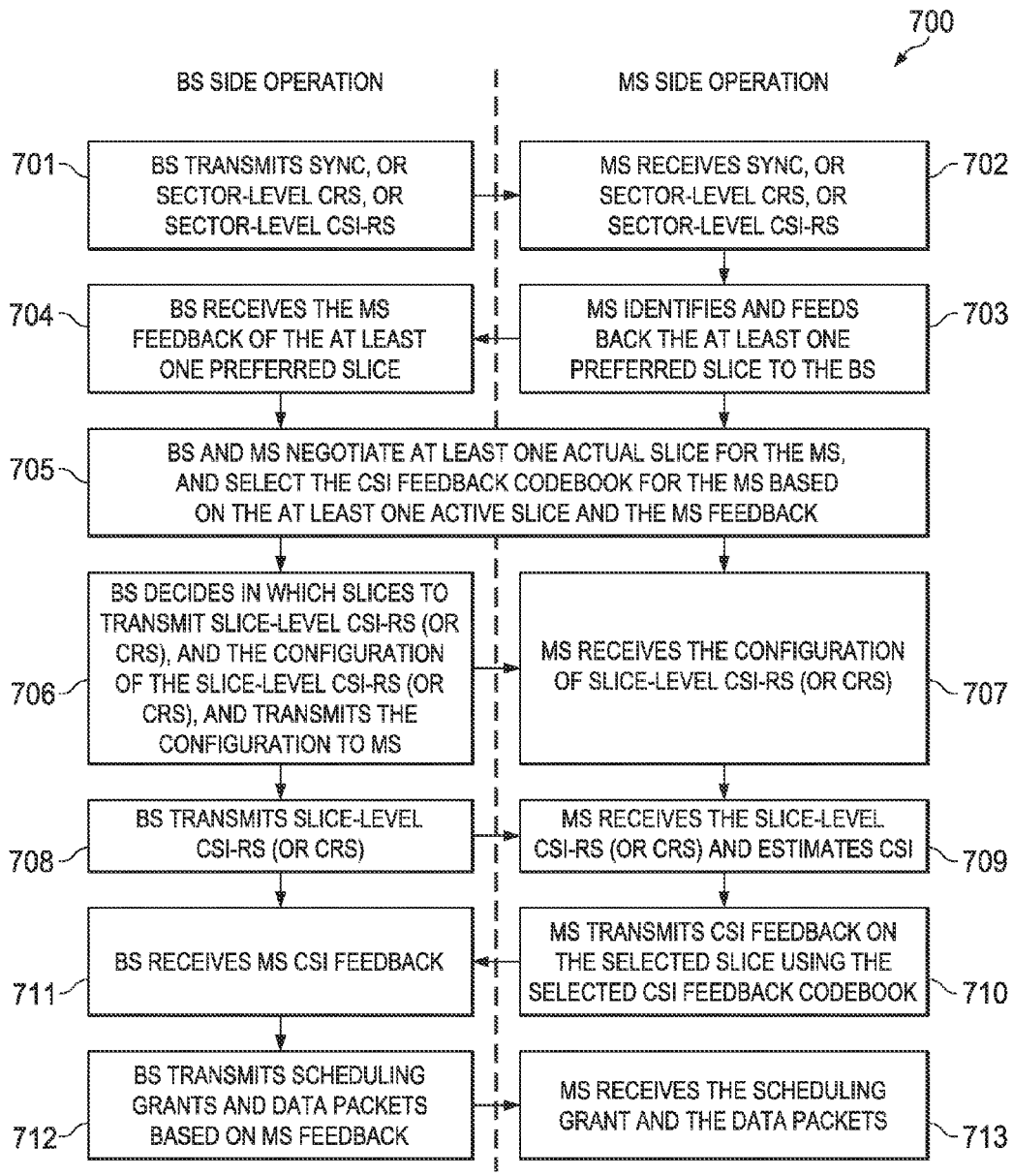
FIG. 7 is a process flow diagram of an example of channel sounding and CSI feedback with configurable slice-level CSI-RS (or CRS) according to one embodiment of the present disclosure.

FIG. 7 is a process flow diagram of an example of channel sounding and CSI feedback with configurable slice-level CSI-RS (or CRS) according to one embodiment of the present disclosure. Steps 701 through 704 of the process 700 are substantially identical in purpose and effect to steps 601 through 605 of process 600 illustrated in FIG. 6, and steps 708 through 713 are substantially identical in purpose and effect to steps 607 through 612. In process 700, however, after long-term large-scale CSI is acquired, a codebook for short-term small-scale feedback is determined as part of the selection of an active slice for the MS (step 705). In addition, the configuration and transmission of slice-level CSI-RS (or CRS) also depends on the long-term large-scale CSI. The BS may turn on, or turn off, or change the configuration of slice-level CSI-RS (or CRS), and communicates this change to the intended MS (steps 706 and 707). By doing so, the BS can allow the MS to use more CSI-RS (or CRS) for better CSI estimation when needed, while at the same time limiting the overhead of CSI-RS (or CRS) by turning off transmission of such signals or by reducing the density when those signals are not needed.

Compared with slice-level CRS, the slice-level CSI-RS primarily serves the purpose of assisting CSI estimation at the mobile station for CSI feedback purpose (step 709). Therefore, the time-frequency density (and thus the overhead) of the slice-level CSI-RS can be made lower than that of the slice-level CRS. On the other hand, in order to improve the spatial resolution of the slice-level CSI-RS in a MIMO system with large number of transmitter and receiver antennas, the slice-level CSI-RS may provide higher spatial sounding capability than the slice-level CRS. For example, the base station can transmit the slice-level CSI-RS using a larger number of transmitter BF precoders than the number of transmitter BF precoders used to transmit slice-level CRS. In order to achieve higher spatial sounding capability, the transmitter BF precoders for slice-level CSI-RS should also have higher BF gain, and thus smaller half-power beam width (HPBW), than the transmitter BF precoders for slice-level CRS. The mobile station can use these slice-level CSI-RS to improve the accuracy and granularity of CSI estimation for CSI feedback. In the example shown in FIG. 3, the mobile station utilizes the slice-level CSI-RS to improve the slice-level and sub-slice-level spatial CSI. If the slice-level CSI-RS provide sufficient coverage and density in both time and frequency domain, higher resolution and accuracy of the CSI in time and frequency (e.g., sub-band CSI feedback for closed-loop BF/SDMA/MIMO operation) can also be obtained.

Figure 8:
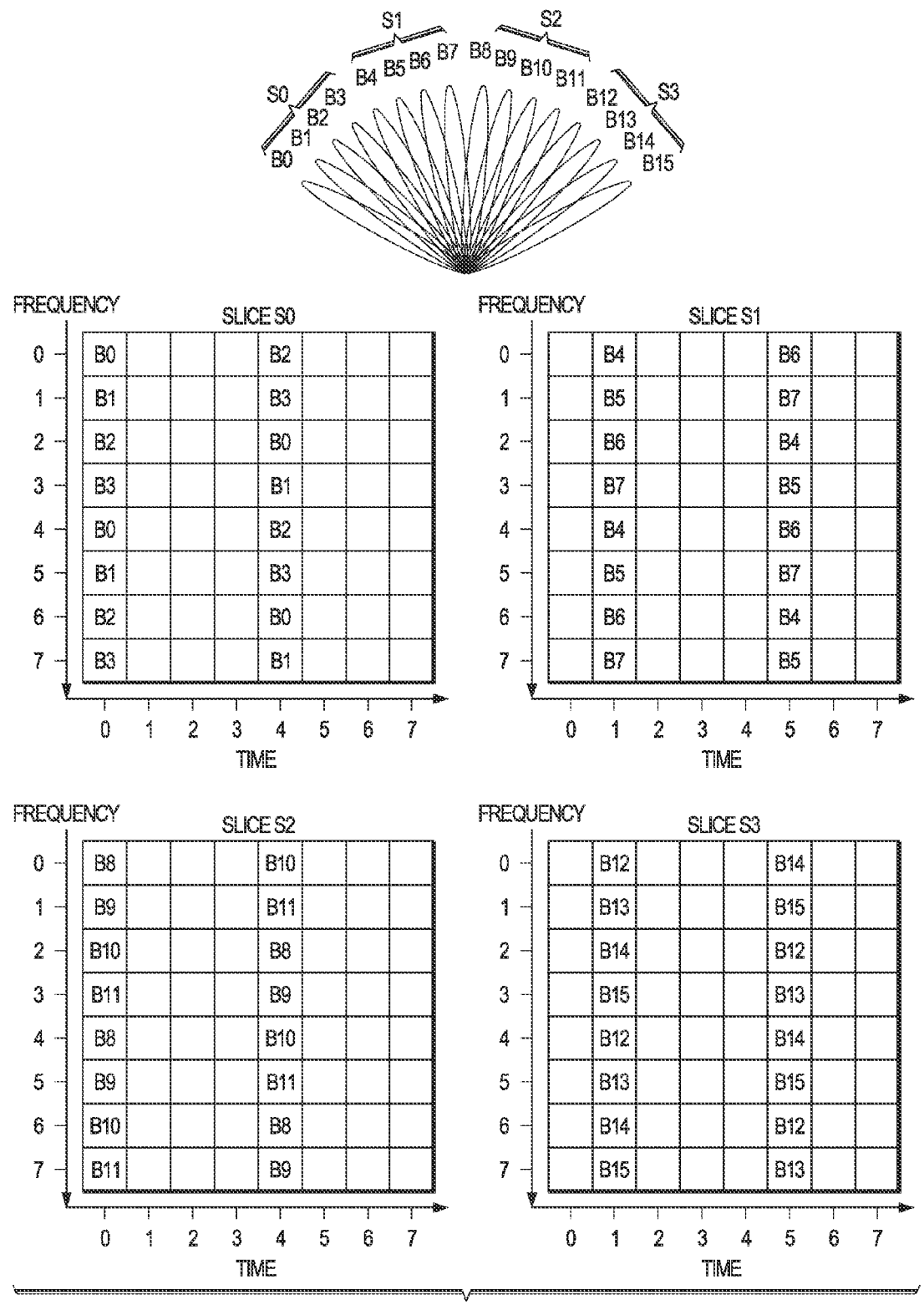
FIG. 8 is an example of slice-level CSI-RS transmission for use in channel sounding and CSI feedback with configurable slice-level CSI-RS (or CRS) according to one embodiment of the present disclosure.

FIG. 8 is an example of slice-level CSI-RS transmission for use in channel sounding and CSI feedback with configurable slice-level CSI-RS (or CRS) according to one embodiment of the present disclosure. In this example, there are four slices, S0, S1, S2, and S3, within the sector. A first codebook with four beams, B0, B1, B2, and B3, is used for the slice-level CSI-RS transmission in slice S0; a second codebook with four beams, B4, B5, B6, and B7, is used for the slice-level CSI-RS transmission in slice S1; a third codebook with four beams, B8, B9, B10, and B11, is used for the slice-level CSI-RS transmission in slice S2; and a fourth codebook with four beams, B12, B13, B14, and B15, is used for the slice-level CSI-RS transmission in slice S3. Note these beams, B0 through B15, can be subsets of a larger codebook, and that such subsets may have overlap, i.e., having one or multiple common or overlapped beams.

The slice-level CSI-RS transmission is also shown in FIG. 8. In each slice S0 through S3, slice-level CSI-RS can be transmitted in different time-frequency resources using different beams. For example, in slice S0, slice-level CSI-RS is transmitted using B0 in resources with (time, frequency) indices of (0, 0), (0, 4), (4, 2), and (4, 6), and is also transmitted using B1 in resources with (time, frequency) indices of (0,1), (0,5), (4,3), and (4,7), and is additionally transmitted using B2 in resources with (time, frequency) indices of (0,2), (0,6), (4,0), and (4,4), and still further is transmitted using B3 in resources with (time, frequency) indices of (0,3), (0,7), (4,1), and (4,5). These transmissions allow sufficient sounding of the channel in each beam on the whole time-frequency space. As also as shown in FIG. 8, similar transmission schemes can be used in other slices as well.

SDMA can be used for slice-level CSI-RS transmission, i.e., slice-level CSI-RS on two different beams can be transmitted in the same time-frequency resources. For example, as shown in FIG. 8, CSI-RS for B0 and CSI-RS for B8 are transmitted in different slices (S0, S2) using the same set of resources with (time, frequency) indices of (0,0), (0,4), (4,2), and (4,6). Similarly, CSI-RS for B1 and CSI-RS for B9 are transmitted in those slices using the same set of time-frequency resources, while CSI-RS for B2 and CSI-RS for B10 are transmitted in the same set of time-frequency resources, etc. In like manner, CSI-RS for B7 and CSI-RS for B15 (for example) are transmitted in different slices (S1, S3) using the same set of time-frequency resources. The CSI-RS for different beams that are transmitted on the same time-frequency resources should be carefully chosen such that inter-beam interference is minimized. Additionally, different scrambling sequences or spreading sequences can be used for each beam such that inter-beam interference can be further suppressed.

Again referring back to FIG. 3, in signal sequence 304, the base station transmits MS-specific demodulation reference signals (DMRS) to assist mobile station demodulation of data channel transmissions. The base station generally only allocates a portion of the time frequency resources for a data channel transmission to a mobile station. The DMRS signals, which assist the mobile station in demodulation of the data channel transmissions, should therefore only be transmitted within the allocated time frequency resources for the respective mobile station. The DMRS signals are used to acquire CSI for demodulation within the reduced CSI space as a result of acquiring the long-term and large-scale CSI. Note that even within this reduced CSI space, there can still be multiple degrees of freedom in the spatial domain. In other words, MIMO transmission with rank greater than 1, i.e., multi-layer MIMO transmission, can still occur. As such, there can also be multiple layers of DMRS signals. The multiple layers of DMRS signals and the multiple layers of data channel transmissions can go through the same spatial processing. In this case, the mobile station can acquire the CSI needed for data channel demodulation by estimating the channel coefficients directly from the DMRS signals. Alternatively, additional precoding can be applied to transform from the precoder of the DMRS signals to the precoder of the data channel MIMO transmissions. In this case, the base station needs to explicitly signal the additional precoding to the mobile station.

In signal sequence 304, the base station also transmits MS-specific CSI-RS. Like the slice-level CSI-RS, these MS-specific CSI-RS signals can be transmitted via multiple antennas or using multiple transmitter BF precoders. These MS-specific CSI-RS signals can be multiplexed in time, frequency, and space. Different sequences can be used for different MS-specific CSI-RS for identification, interference randomization, and interference suppression purposes.

In one embodiment of the disclosure, the MS-specific CSI-RS for a mobile station are transmitted using transmitter BF precoders that have strong spatial correlation with the channel from the base station to the mobile station. In other words, the MS-specific CSI-RS of a MS stay "within" or "close to" the channel from the BS to the MS. Like slice-level CSI-RS, a base station can spatially multiplex the MS-specific CSI-RS of different mobile stations in the same time and frequency resources. The configuration of MS-specific CSI-RS can be dynamically adjusted. For example, base station may turn off the MS-specific CSI-RS if there is no need for the MS to measure CSI using the MS-specific CSI-RS. The base station may turn on the MS-specific CSI-RS for a mobile station if there is a need for that MS to measure CSI using the MS-specific CSI-RS. More generally, the base station can dynamically configure the density of MS-specific CSI-RS for a mobile station. Upon reconfiguring the MS-specific CSI-RS, the base station should transmit a message to the mobile station to inform the mobile station of the reconfiguration. The message can be either a broadcast message or a uni-cast message. The BS can send the MS-specific CSI-RS configuration information together with a request for the MS to feedback CSI measured from the MS-specific CSI-RS.

Figure 9:
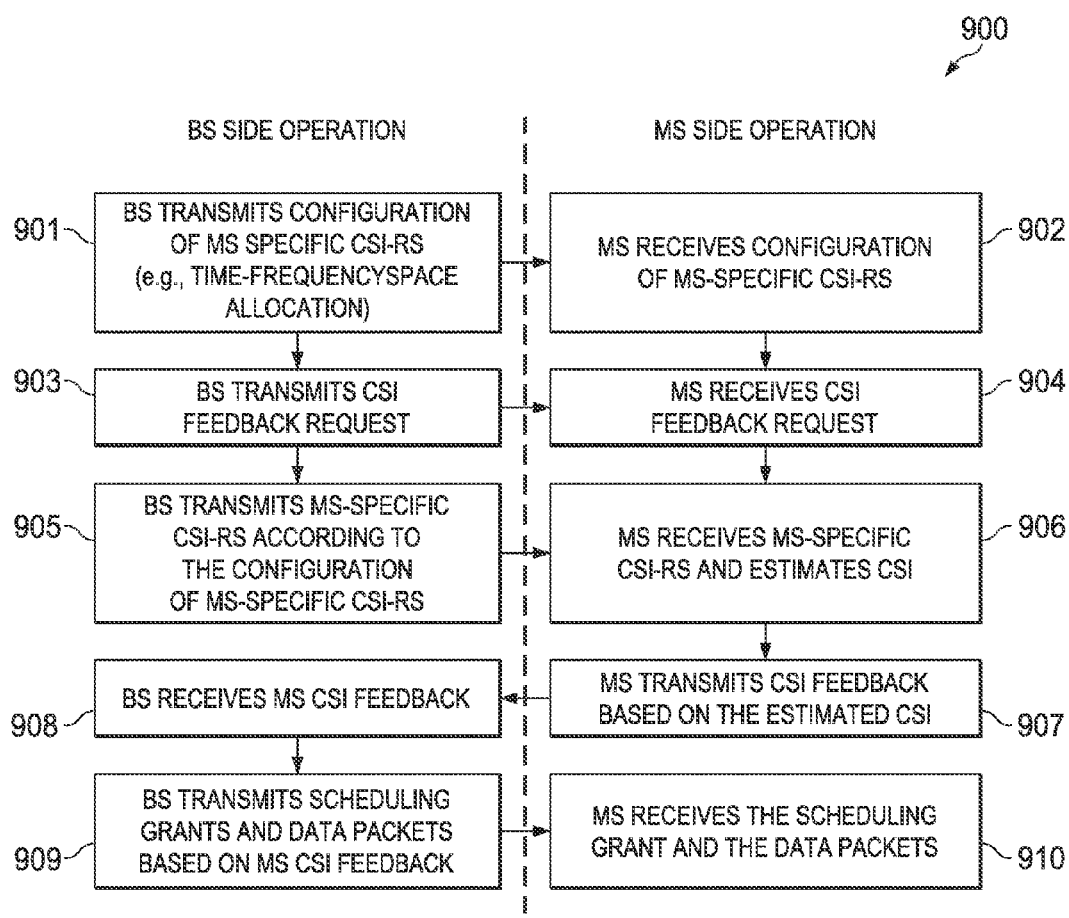
FIG. 9 is a process flow diagram for one example of MS-specific CSI-RS transmission and the associated CSI feedback according to one embodiment of the present disclosure.

FIG. 9 is a process flow diagram for one example of MS-specific CSI-RS transmission and the associated CSI feedback according to one embodiment of the present disclosure. In the process 900 of this example, the base station initiates the transmission of MS-specific CSI-RS (step 901), which is received by the MS (step 902). The base station can send a request to mobile station for CSI feedback (step 903). Preferably at the same time of the request, the base station configures MS-specific CSI-RS to assist the MS in CSI feedback, and transmits that MS-specific CSI-RS to the MS (step 905). Upon receiving the CSI feedback request (step 904) and the configuration of MS-specific CSI-RS (step 906), the mobile station knows the resource allocation for the MS-specific CSI-RS and can thus use that resource allocation for CSI feedback (step 907). Steps 908 through 910 of the process 900 are substantially identical in purpose and effect to steps 610 through 612 of process 600 illustrated in FIG. 6.

Notably, the CSI feedback request can also be made implicit. For example, if mobile station detects the message that carries a valid MS-specific CSI-RS configuration, the valid MS-specific CSI-RS configuration can be used as an indication that the BS is requesting a CSI feedback. The configuration of MS-specific CSI-RS can be valid for only one transmission, or multiple transmissions, or periodic, or remain valid until the next configuration.

Figure 10:
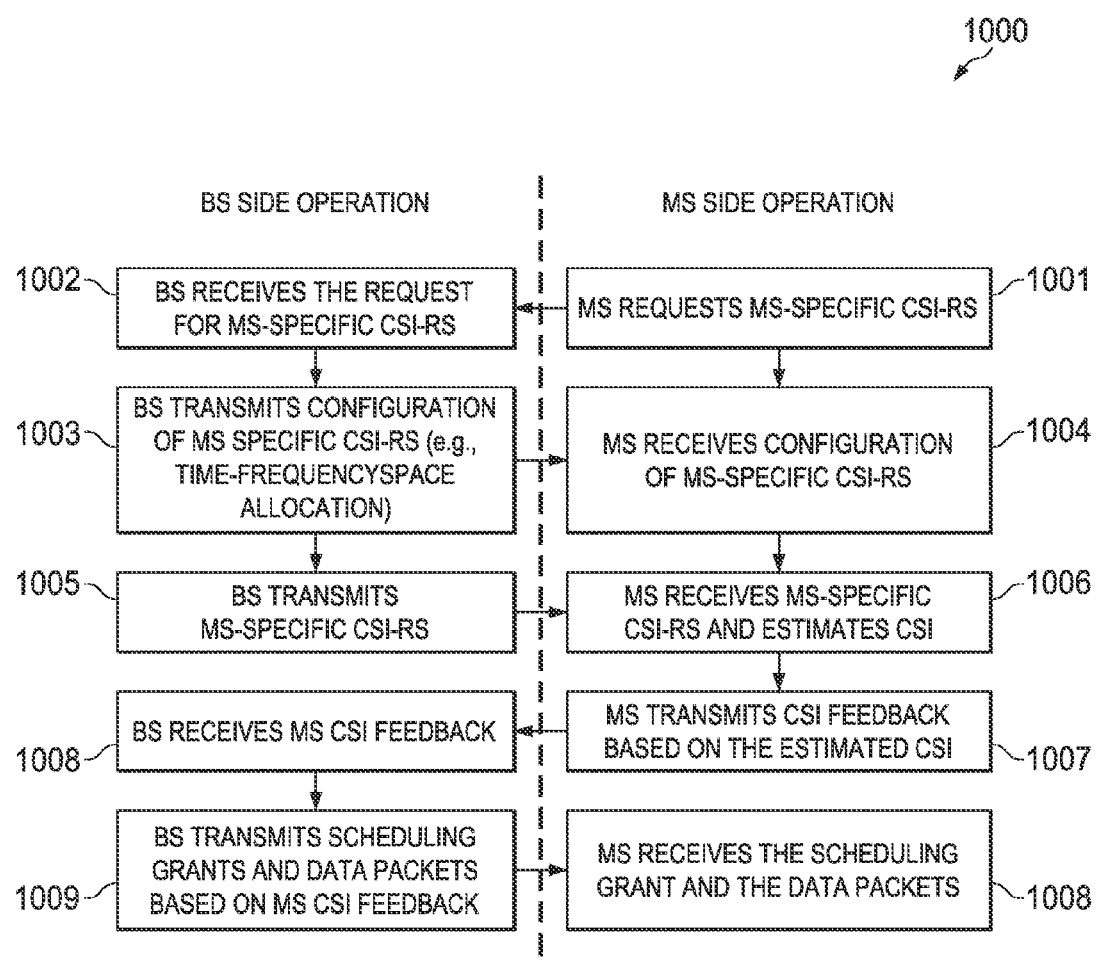
FIG. 10 is a process flow diagram for another example of MS-specific CSI-RS transmission and the associated CSI feedback according to one embodiment of the present disclosure.

FIG. 10 is a process flow diagram for another example of MS-specific CSI-RS transmission and the associated CSI feedback according to one embodiment of the present disclosure. In this process example 1000, the mobile station requests the transmission of MS-specific CSI-RS from the base station (steps 1001 and 1002). If the request is allowed by the base station, the base station configures MS-specific CSI-RS to assist the MS in CSI feedback, and transmits the configuration (step 1003). Upon receiving the configuration of MS-specific CSI-RS (step 1004), the mobile station knows the resource allocation for the MS-specific CSI-RS and can thus use that resource allocation for CSI feedback (step 1007). Steps 1008 through 1010 of the process 1000 are substantially identical in purpose and effect to steps 610 through 612 of process 600 illustrated in FIG. 6.

In summary, using the sync and reference signals transmitted in sequences 301 and 302 of FIG. 3, the mobile station should be able to identify the long-term large-scale CSI with good fidelity. The selection of preferred sectors and preferred slices also reduces the channel state information space in which short-term and small-scale CSI remains to be resolved, with finer granularity and accuracy. This reduction of channel state information space by resolving long-term and large-scale CSI makes it practically possible to estimate short-term and small-scale CSI within a small channel state information space using reasonable amount of reference signals in sequences 303 304.

Figure 11:
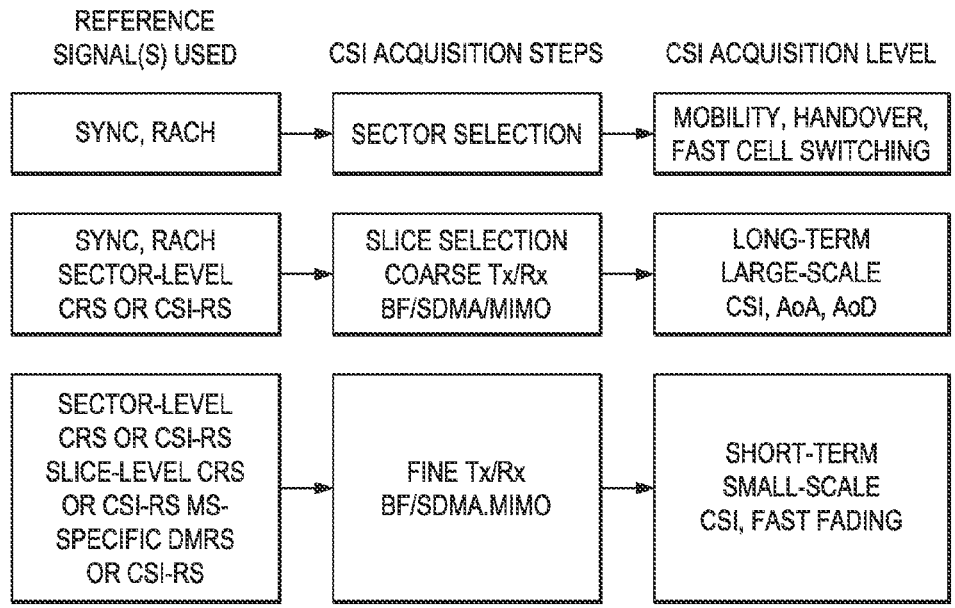
FIG. 11 is an alternative illustration of the hierarchical CSI acquisition depicted in FIG. 3.

FIG. 11 is an alternative illustration of the hierarchical CSI acquisition depicted in FIG. 3. Different reference signals are utilized in each step to achieve different level of CSI acquisition. As the mobile station goes through the multiple CSI acquisition steps, finer and finer granularity of CSI acquisition is achieved.

Note that although an extensive procedure is described for illustration purpose as shown in FIG. 3, not all reference signals or CSI acquisition steps are needed for all systems. In some systems or scenarios, certain steps may be skipped.

Figure 12:
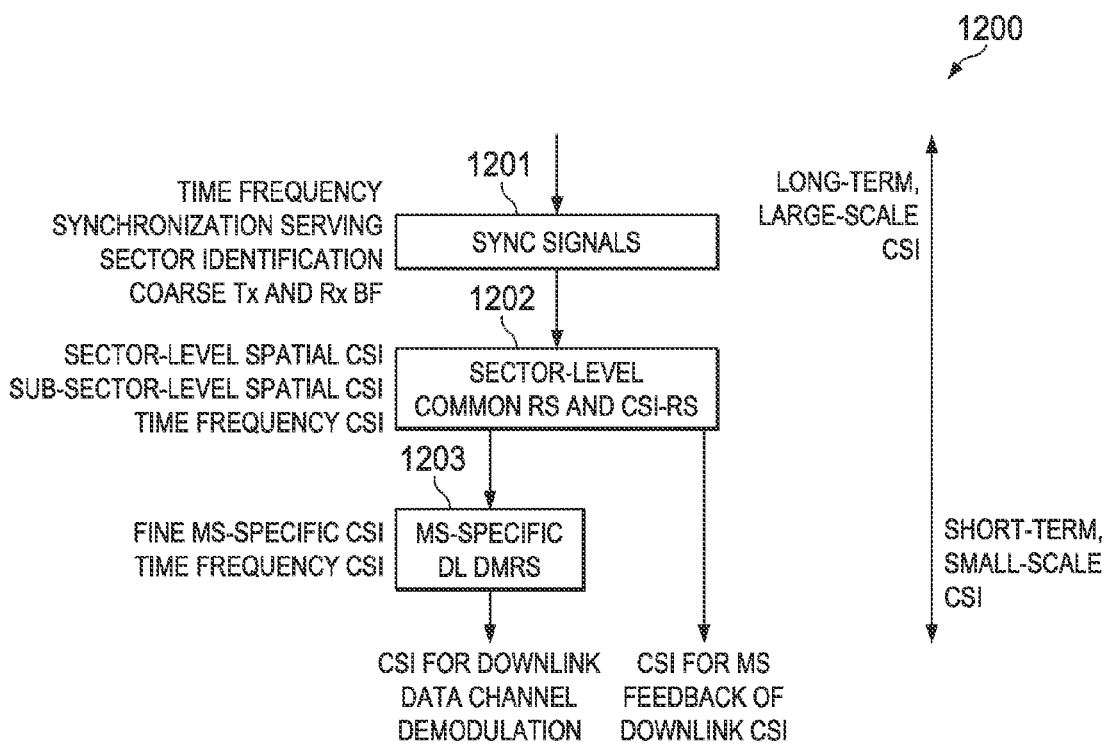
FIG. 12 depicts one example of a simplified hierarchical channel sounding and CSI estimation scheme according to one embodiment of the present disclosure.

FIG. 12 depicts one example of a simplified hierarchical channel sounding and CSI estimation scheme hierarchical channel sounding and CSI estimation scheme according to one embodiment of the present disclosure. In this exemplary simplified signal sequence 1200, sync signals 1201 are transmitted as in FIG. 3 and CRS and CSI-RS 1202 are likewise transmitted at the sector-level as in FIG. 3, while MS-specific DMRS 1203 are used for demodulation as in FIG. 3. Upon acquiring the coarse (long-term) transmitter and receiver BF information, however, the MS can use sector-level CSI-RS 1202 to estimate fine (short-term) CSI information and generate CSI feedback directly. The codebook used by the MS for CSI feedback depends on the coarse transmitter and receiver BF information acquired based on sync signals 1201. This simplified scheme 1200 will help reduce the CSI feedback overhead and improve the CSI feedback granularity.

Figure 13:
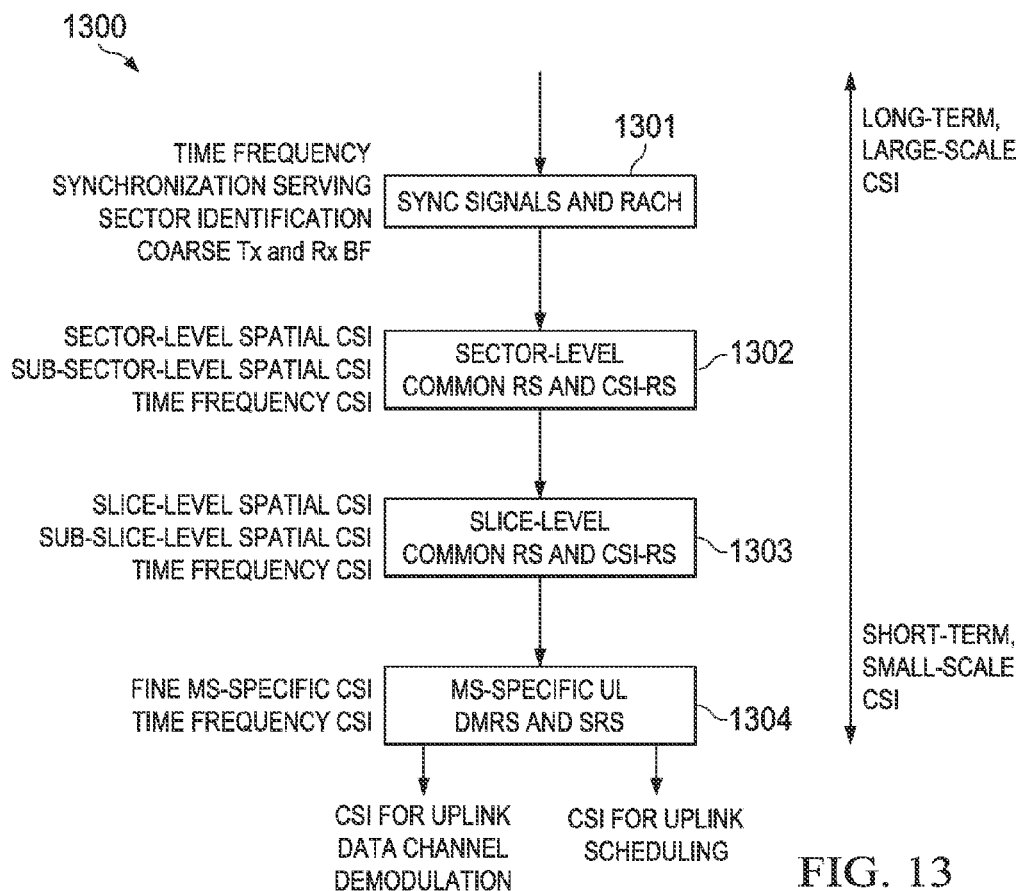
FIG. 13 depicts an example of hierarchical uplink channel sounding and CSI estimation according to one embodiment of the present disclosure.

Although downlink CSI acquisition was used an example to illustrate hierarchical channel sounding and CSI estimation in FIG. 3, the techniques are equally applicable in the uplink. FIG. 13 depicts an example of hierarchical uplink channel sounding and CSI estimation according to one embodiment of the present disclosure. As evident from comparison with FIG. 3, the signal sequence 1300 of FIG. 13 follows similar steps as the example of a hierarchical downlink channel sounding and CSI estimation signal sequence 300 described above, except that a Random Access Channel (RACH) uplink transmission by the MS may occur concurrent with the transmission of sync signals 1301, the MS-specific UL DMRS 1304 is transmitted by mobile station instead of the MS-specific DL DMRS transmitted by base station, and mobile station also transmits the MS-specific UL sounding reference signal (SRS) 1304 in place of the MS-specific CSI-RS. The signal sequences 1302-1303 parallel the counterpart signal sequences 302-303 in FIG. 3. This scheme 1300 works well if downlink-uplink channel reciprocity can be assumed, at least for long-term large-scale channel state information, since the long-term large-scale CSI is resolved using downlink reference signals 1301-1302, while short-term small-scale CSI is resolved using uplink reference signals 1303-1304.

Figure 14:
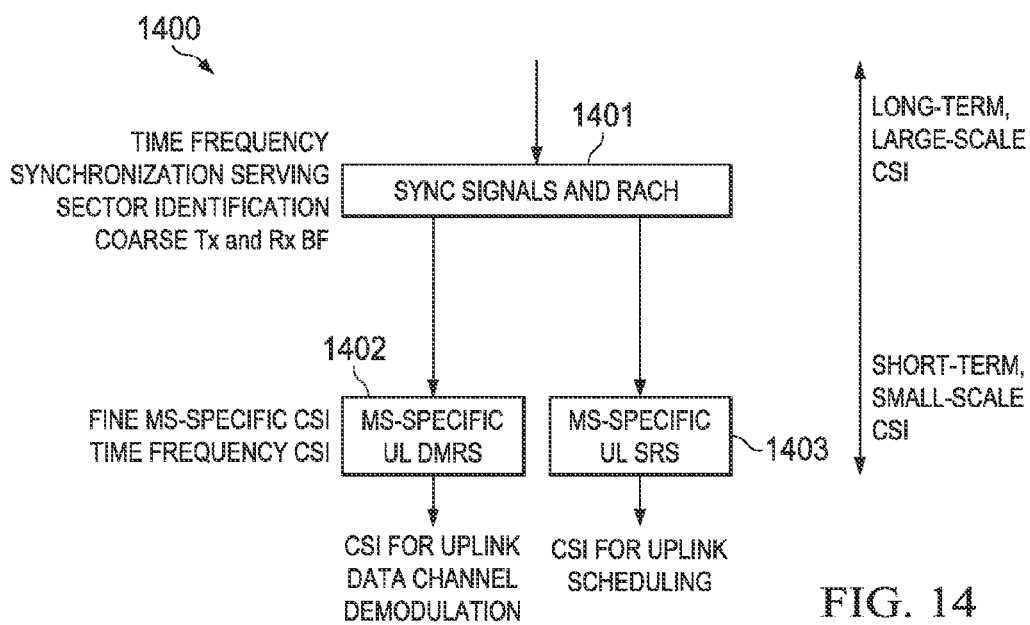
FIG. 14 depicts another example of a hierarchical uplink CSI acquisition scheme according to one embodiment of the present disclosure.

FIG. 14 depicts another example of a hierarchical uplink CSI acquisition scheme according to one embodiment of the present disclosure. In the signal sequence 1400 of this example, downlink-uplink channel reciprocity is not assumed. Time and frequency synchronization and serving sector identification are achieved via detection of sync signals 1401. Upon completing the random access procedure (RACH), the sequence timing advances to uplink transmissions, and coarse transmitter and receiver BF can also be achieved for uplink transmissions. The MS transmits UL DMRS 1402 to assist the BS demodulation of uplink data channel transmissions. The MS-specific UL SRS 1403 is transmitted for the BS to acquire CSI for uplink scheduling. Since coarse transmitter and receiver BF information is acquired based on the signals 1401, the CSI space for CSI estimation based on 1402 and 1403 is reduced, reducing the reference signal overhead needed to achieve accurate CSI for demodulation and scheduling purpose.

While each process flow and signal sequence depicted in the figures and described above depicts a sequence of steps and/or signals, either in series or in tandem, unless explicitly stated or otherwise self-evident (e.g., a signal cannot be received before being transmitted) no inference should be drawn from that sequence regarding specific order of performance, performance of steps or portions or transmission of signals thereof serially rather than concurrently or in an overlapping manner, or performance the steps or transmission of signals depicted exclusively without the occurrence of intervening or intermediate steps or signals. Moreover, those skilled in the art will recognize that complete processes and signal sequences are not illustrated or described. Instead, for simplicity and clarity, only so much of the respective processes and signal sequences as is unique to the present disclosure or necessary for an understanding of the present disclosure is depicted and described.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A method, comprising:
configuring, by a base station (BS), hierarchical channel sounding, each using a different transmitter spatial processing scheme, wherein the hierarchical channel sounding comprises synchronization signals, sector-level reference signals, and slice-level reference signals;
establishing, by the BS, the hierarchical channel sounding associated with the different transmitter spatial processing scheme to at least one mobile station (MS) over a massive multi-input multi-output (MIMO) channel, wherein the different transmitter spatial processing scheme is determined by a different set of multiple angle of departures, and a different set of transmitter codebooks or a different set of transmitter precoders;
receiving, by the BS, a feedback signal from the at least one MS over the massive MIMO channel, wherein the feedback signal includes at least one preferred slice information associated with the slice-level reference signals that have been transmitted to the MS;
determining, by the BS, an actual slice in accordance with the feedback information, long-term channel state information (CSI) received from the at least one MS, and short-term CSI received from the at least one MS, wherein the long-term CSI is determined by the synchronization signals and the sector-level reference signals, and the short-term CSI is determined by the slice-level reference signals included in the hierarchical channel sounding; and
transmitting one or more reference signals associated with the determined actual slice to the at least one MS, wherein the actual slice is an active slice providing a communication between the at least one MS and the BS, and wherein the reference signals associated with the determined actual slice are slice-level reference signals.

2. The method according to claim 1, wherein the long-term CSI comprises one or more of
a number of communication paths between the BS and the at least one MS, or
angle of departure and angle of arrival pairs for the number of communication paths between the BS and the at least one MS.

3. The method according to claim 1, wherein the short-term CSI comprises complex channel coefficients.

4. The method according to claim 1, wherein the synchronization signals comprise a sequence of synchronization signals selected based upon a cell index, a time index, a frequency index and a spatial index, mapped to time-frequency resources according to the time and frequency indices, and spatially processed according to the spatial index.

5. The method according to claim 1, wherein the synchronization signals are transmitted using at least one of a different beamforming (BF), a space division multiple access (SDMA), MIMO transmitter codebooks and different BFs, an SDMA, or MIMO transmitter precoders.

6. The method according to claim 1, wherein transmitting one or more determined slice-level reference signals to the at least one MS comprises selecting one of a plurality of transmitter spatial processing schemes.

7. The method according to claim 6, wherein selecting one of a plurality of transmitter spatial processing schemes comprises either
selecting one of a plurality of BFs, SDMAs, or MIMO transmitter codebooks, or
selecting one of a plurality of different BFs, SDMAs, or MIMO transmitter precoders.

8. The method according to claim 7, wherein selecting of one of a plurality of different BFs, SDMAs, or MIMO transmitter precoders is based upon an index of a mobile station feedback field.

9. The method according to claim 1, wherein transmitting one or more reference signals associated with the determined actual slice to the at least one MS comprises selecting one of a plurality of receiver spatial processing schemes.

10. The method according to claim 9, wherein selecting one of a plurality of receiver spatial processing schemes comprises either
selecting one of a plurality of BFs, SDMAs, or MIMO transmitter codebooks, or
selecting one of a plurality of different BFs, SDMAs, or MIMO receiver precoders.

11. The method according to claim 10, wherein selecting of one of a plurality of different BFs, SDMAs, or MIMO receiver precoders is based upon an index of a mobile station feedback field.

12. The method according to claim 1, wherein transmitting one or more reference signals associated with the determined actual slice to the at least one MS comprises:
multiplexing slice-level common reference signals (CRSs) of different slices in the same time and frequency resources.

13. The method according to claim 1, wherein transmitting one or more reference signals associated with the determined actual slice to the at least one MS comprises:
dynamically adjusting a configuration of slice-level common reference signals (CRSs) by one of turning on or off slice-level CRSs within one of the slices and configuring a density of slice-level CRSs within one of the slices; and
upon adjusting the configuration of the slice-level CRSs, signaling changes to the MS.

14. The method according to claim 1, wherein transmitting one or more reference signals associated with the determined actual slice to the at least one MS comprises:
using a transmitter beamforming precoder having strong spatial correlation to the slice in which where the mobile station is located.

15. The method according to claim 1, wherein transmitting one or more reference signals associated with the determined actual slice to the at least one MS comprises:
multiplexing slice-level channel state information reference signals (CSI-RSs) of different slices in the same time and frequency resources.

16. The method according to claim 1, wherein transmitting one or more reference signals associated with the determined actual slice to the at least one MS comprises:
dynamically adjusting a configuration of slice-level channel state information reference signals (CSI-RSs) by one of turning on or off slice-level CSI-RSs within one of the slices and configuring a density of slice-level CSI-RSs within one of the slices; and
upon adjusting the configuration of the slice-level CSI-RSs, signaling changes to the MS.

17. A base station, comprising:
a controller configured to:
configure a hierarchical channel sounding, each using a different transmitter spatial processing scheme, wherein the hierarchical channel sounding comprises synchronization signals, sector-level reference signals, and slice-level reference signals;
establish the hierarchical channel sounding associated with the different transmitter spatial processing scheme to at least one mobile station (MS) over a massive multi-input multi-output (MIMO) channel, wherein the different transmitter spatial processing scheme is determined by a different set of multiple angle of departures, and a different set of transmitter codebooks or a different set of transmitter precoders; and
determine an actual sector and slice in accordance with the feedback information using channel state information (CSI) received from the at least one MS, wherein the CSI is computed using reference signals included in the hierarchical channel sounding; and
a transceiver is configured to:
receive a feedback signal from the at least one MS over the massive MIMO channel, wherein the feedback signal includes at least one preferred sector and slice information associated with the sector-level and slice-level reference signals that have been transmitted to the MS; and
transmit one or more reference signals associated with the determined actual slice to the at least one MS, wherein the actual slice is an active slice providing a communication between the at least one MS and the BS.

18. The base station according to claim 17, wherein the long-term CSI comprises one or more of:
a number of communication paths between the BS and the at least one MS, or
angle of departure and angle of arrival pairs for the number of communication paths between the BS and the at least one MS.

19. The base station according to claim 17, wherein the short-term CSI comprises complex channel coefficients.

20. The base station according to claim 17, wherein the synchronization signals comprise a sequence of synchronization signals selected based upon a cell index, a time index, a frequency index and a spatial index, mapped to time-frequency resources according to the time and frequency indices, and spatially processed according to the spatial index.

21. The base station according to claim 17, wherein the synchronization signals are transmitted using at least one of different beamforming (BF), space division multiple access (SDMA), or multiple input, multiple output (MIMO) transmitter codebooks and different BF, SDMA, or MIMO transmitter precoders.

22. The base station according to claim 17, wherein the synchronization signals are transmitted using at least one of a different beamforming (BF), a space division multiple access (SDMA), or MIMO transmitter codebooks and different BFs, an SDMA, or MIMO transmitter precoders.

23. The base station according to claim 22, wherein the controller is configured to either
  select one of a plurality of BFs, SDMAs, or MIMO transmitter codebooks, or
  select one of a plurality of different BFs, SDMAs, or MIMO transmitter precoders.

24. The base station according to claim 23, wherein the controller is configured to select one of a plurality of different BFs, SDMAs, or MIMO transmitter precoders is based upon an index of a mobile station feedback field.

25. The base station according to claim 17, wherein the controller is configured to select one of a plurality of receiver spatial processing schemes.

26. The base station according to claim 25, wherein the controller is configured to either
  select one of a plurality of BFs, SDMAs, or MIMO transmitter codebooks, or
  select one of a plurality of different BFs, SDMAs, or MIMO receiver precoders.

27. The base station according to claim 17, wherein the controller is configured to selected one of a plurality of different BFs, SDMAs, or MIMO receiver precoders based upon an index of a mobile station feedback field.

28. The base station according to claim 17, wherein the controller is configured to multiplex slice-level common reference signals (CRSs) of different slices in the same time and frequency resources.

29. The base station according to claim 17, wherein the controller is configured to
  dynamically adjust a configuration of slice-level common reference signals (CRSs) by one of turning on or off slice-level CRSs within one of the slices and configuring a density of slice-level CRSs within one of the slices, and
  upon adjusting the configuration of the slice-level CRSs, signal changes to the MS.

30. The base station according to claim 17, wherein the controller is configured to use a transmitter beamforming precoder having strong spatial correlation to the slice where the mobile station is located.

31. The base station according to claim 17, wherein the controller is configured to multiplex slice-level channel state information reference signals (CSI-RSs) of different slices in same time and frequency resources.

32. The base station according to claim 17, wherein the controller is configured to
  dynamically adjust a configuration of slice-level channel state information reference signals (CSI-RSs) by one of turning on or off slice-level CSI-RSs within one of the slices and configuring a density of slice-level CSI-RSs within one of the slices, and
  upon adjusting the configuration of the slice-level CSI-RSs, signal changes to the MS.

33. A method, comprising:
  measuring, by a mobile station (MS) a hierarchical channel sounding associated with a different transmitter spatial processing scheme over a massive multi-input multi-output (MIMO) channel, wherein the different transmitter spatial processing scheme is determined by a different set of multiple angle of departures, and a different set of transmitter codebooks or a different set of transmitter precoders;
  determining long-term channel state information (CSI) using synchronization signals and sector-level reference signals and short-term CSI using a slice-level reference signals included in the hierarchical channel sounding;
  determining one or more preferred actual slices in the sector for communications with the at least one base station and the mobile station, wherein the one or more actual slice is an active slice providing a communication between the at least one BS and the MS; and
  transmitting a feedback signal to the at least one BS over the massive MIMO channel, wherein the feedback signal includes at least one or more preferred slice information associated with the slice-level reference signals that have been received from the BS; and
  receiving one or more reference signals associated with the determined actual slice to the at least one MS, wherein the reference signals associated with the determined actual slice are slice-level reference signals.

34. The method according to claim 33, wherein the long-term CSI comprises one or more of
  a number of communication paths between the BS and the at least one MS, or
  angle of departure and angle of arrival pairs for the number of communication paths between the BS and the at least one MS.

35. The method according to claim 34, wherein the short-term CSI comprises complex channel coefficients.

36. The method according to claim 34, wherein the feedback signal indicating the one or more preferred slices corresponds to at least one of a different beamforming (BF), a space division multiple access (SDMA), or MIMO transmitter codebooks and different BFs, an SDMA, or MIMO transmitter precoders.

37. The method according to claim 34, wherein the one or more slice-level reference signals are transmitted using one of a plurality of transmitter spatial processing schemes.

38. The method according to claim 34, further comprising:
  transmitting the feedback signal corresponding to one of a plurality of different BFs, SDMAs, or MIMO transmitter precoders.

39. The method according to claim 33, further comprising:
  using a selected one of a plurality of receiver spatial processing schemes.

40. A mobile station, comprising:
  a controller configured to:
    measure hierarchical channel sounding associated with a different transmitter spatial processing scheme over a massive multi-input multi-output (MIMO) channel, wherein the different transmitter spatial processing scheme is determined by a different set of multiple angle of departures, and a different set of transmitter codebooks or a different set of transmitter precoders;
    determine long-term channel state information (CSI) using synchronization signals and sector-level reference signals and short-term CSI using a slice-level reference signals included in the hierarchical channel sounding;
  determine one or more preferred actual slices in the sector for communications with the at least one base station and the mobile station, wherein the one or more actual slice is an active slice providing a communication between the at least one BS and the MS;

a transceiver configured to:
transmit a feedback signal to the at least one BS over the massive MIMO channel, wherein the feedback signal includes at least one or more preferred slice information associated with the slice-level reference signals that have been received from the BS; and
receive one or more reference signals associated with the determined actual slice to the at least one MS, wherein the reference signals associated with the determined actual slice are slice-level reference signals.

41. The mobile station according to claim 40, wherein the long-term CSI comprises one or more of
a number of communication paths between the BS and the at least one MS, and
angle of departure and angle of arrival pairs for the number of communication paths between the BS and the at least one MS.

42. The mobile station according to claim 41, wherein the short-term CSI comprises complex channel coefficients.

43. The mobile station according to claim 41, wherein the feedback signal indicating the one or more preferred slices corresponds to at least one of a different beamforming (BF), a space division multiple access (SDMA), or MIMO transmitter codebooks and different BFs, an SDMA, or MIMO transmitter precoders.

44. The mobile station according to claim 41, wherein the one or more slice-level reference signals are transmitted using one of a plurality of transmitter spatial processing schemes.

45. The mobile station according to claim 41, wherein the transceiver is configured to transmit the feedback signal corresponding to one of a plurality of different BFs, SDMAs, or MIMO transmitter precoders.

46. The mobile station according to claim 40, wherein the controller is configured to use a selected one of a plurality of receiver spatial processing schemes.

47. The method of claim 1, further comprising:
transmitting one or more reference signals associated with the determined actual slice to the at least one MS, wherein the actual slice is an active slice providing a communication between the at least one MS and the BS, wherein the reference signals associated with the determined actual slice are slice-level reference signals within one or more determined slices in a sector to the at least one MS.

48. The method of claim 17, the controller is further configured to transmit one or more reference signals associated with the determined actual slice to the at least one MS, wherein the actual slice is an active slice providing a communication between the at least one MS and the BS, wherein the reference signals associated with the determined actual slice are slice-level reference signals within one or more determined slices in a sector to the at least one MS.

49. The method of claim 33, further comprising:
receiving one or more reference signals associated with the determined actual slice to the at least one MS, wherein the actual slice is an active slice providing a communication between the at least one MS and the BS, wherein the reference signals associated with the determined actual slice are slice-level reference signals within one or more determined slices in a sector to the at least one MS.

50. The method of claim 40, the transceiver is further configured to receive one or more reference signals associated with the determined actual slice to the at least one MS, wherein the actual slice is an active slice providing a communication between the at least one MS and the BS, wherein the reference signals associated with the determined actual slice are slice-level reference signals within one or more determined slices in a sector to the at least one MS.

* * * * *